(12) United States Patent
Sato et al.

(10) Patent No.: US 10,527,917 B2
(45) Date of Patent: Jan. 7, 2020

(54) DISCHARGE LAMP DRIVE DEVICE, LIGHT SOURCE DEVICE, PROJECTOR, AND DISCHARGE LAMP DRIVE METHOD

(71) Applicant: SEIKO EPSON CORPORATION, Tokyo (JP)

(72) Inventors: Shun Sato, Matsumoto (JP); Masaru Kono, Toyooka-mura (JP); Junichi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/229,016

(22) Filed: Dec. 21, 2018

(65) Prior Publication Data

US 2019/0196318 A1 Jun. 27, 2019

(30) Foreign Application Priority Data

Dec. 25, 2017 (JP) ................. 2017-247350

(51) Int. Cl.
*G03B 21/20* (2006.01)
*H05B 41/392* (2006.01)
(Continued)

(52) U.S. Cl.
CPC ..... *G03B 21/2053* (2013.01); *G03B 21/2026* (2013.01); *G03B 21/2073* (2013.01);
(Continued)

(58) Field of Classification Search
CPC .... H05B 37/02; H05B 37/0227; H05B 37/72; H05B 33/08; H05B 33/0842;
(Continued)

(56) References Cited

U.S. PATENT DOCUMENTS 6,867,556 B2  3/2005  Arimoto et al.
8,120,285 B2  2/2012  Terashima et al.
(Continued)

FOREIGN PATENT DOCUMENTS

FR  2926183 A1  7/2009
JP  4186578 B2  11/2008
(Continued)

OTHER PUBLICATIONS

Jun. 7, 2019 European Search Report issued in European Patent Application No. 18215346.0.

*Primary Examiner* — William C. Dowling
(74) *Attorney, Agent, or Firm* — Oliff PLC

(57) ABSTRACT

A discharge lamp drive device includes a discharge lamp driver configured to supply drive electric current to a discharge lamp having a first electrode and a second electrode, a control unit configured to control the discharge lamp driver, and a storage unit configured to store a plurality of drive patterns of the drive electric current. The control unit is configured to select one drive pattern from among the plurality of drive patterns based on machine learning, and implement the selected drive pattern. The control unit performs a first control that increases a drive electric power supplied to the discharge lamp according to an increase in an inter-electrode voltage of the discharge lamp, in a case where the inter-electrode voltage is equal to or larger than a first voltage value and the inter-electrode voltage is equal to or lower than a second voltage value higher than the first voltage value.

20 Claims, 14 Drawing Sheets

(51) Int. Cl.
  *H05B 41/288* (2006.01)
  *H01J 61/02* (2006.01)
  *H01J 61/073* (2006.01)
  *G03B 21/00* (2006.01)
  *G09G 3/00* (2006.01)

(52) U.S. Cl.
  CPC .......... *H01J 61/025* (2013.01); *H01J 61/073* (2013.01); *H05B 41/2883* (2013.01); *H05B 41/2887* (2013.01); *H05B 41/3921* (2013.01); *G03B 21/006* (2013.01); *G09G 3/001* (2013.01); *G09G 2320/043* (2013.01); *G09G 2330/02* (2013.01)

(58) Field of Classification Search
  CPC ........ H05B 41/2828; H05B 41/288738; G03B 21/2026; G03B 21/2053; H04N 9/3155
  See application file for complete search history.

(56) References Cited

U.S. PATENT DOCUMENTS

| | | | |
|---|---|---|---|
| 9,509,965 B2 | 11/2016 | Nakagomi et al. | |
| 9,730,304 B2 | 8/2017 | Saka | |
| 9,785,041 B2 | 10/2017 | Sato et al. | |
| 10,295,894 B2 * | 5/2019 | Sato | G03B 21/2053 |
| 10,375,808 B2 * | 8/2019 | Suzuki | H05B 41/2923 |
| 2004/0075392 A1 | 4/2004 | Arimoto et al. | |
| 2009/0237009 A1 | 9/2009 | Okawa et al. | |
| 2010/0134033 A1 | 6/2010 | Terashima et al. | |
| 2010/0201281 A1 | 8/2010 | Terashima et al. | |
| 2015/0103323 A1 | 4/2015 | Nakagomi et al. | |
| 2016/0320693 A1 | 11/2016 | Sato et al. | |
| 2017/0142816 A1 | 5/2017 | Saka | |
| 2018/0252994 A1 * | 9/2018 | Sato | G03B 21/2053 |
| 2019/0090332 A1 * | 3/2019 | Suzuki | H05B 41/36 |
| 2019/0090333 A1 * | 3/2019 | Kono | H05B 41/38 |
| 2019/0090334 A1 * | 3/2019 | Suzuki | H05B 41/38 |
| 2019/0104602 A1 * | 4/2019 | Sato | H05B 41/3921 |
| 2019/0199985 A1 * | 6/2019 | Suzuki | H05B 41/2887 |

FOREIGN PATENT DOCUMENTS

| | | |
|---|---|---|
| JP | 2008-304588 A | 12/2008 |
| JP | 2009-169304 A | 7/2009 |
| JP | 4311162 B2 | 8/2009 |
| JP | 2011-103310 A | 5/2011 |
| JP | 2012-108216 A | 6/2012 |
| JP | 2016-018746 A | 2/2016 |
| JP | 2016-213011 A | 12/2016 |
| JP | 6303704 B2 | 4/2018 |

* cited by examiner

DISCHARGE LAMP DRIVE DEVICE, LIGHT SOURCE DEVICE, PROJECTOR, AND DISCHARGE LAMP DRIVE METHOD

BACKGROUND

1. Technical Field

The present invention relates to a discharge lamp drive device, a light source device, a projector, and a discharge lamp drive method.

2. Related Art

For example, as disclosed in JP-A-2016-018764, a discharge lamp lighting device is known that changes a pulse of alternating electric current to be supplied to a discharge lamp according to a value of an application voltage that is applied to the discharge lamp.

However, the discharge lamp has an individual difference, and a change in the application voltage (an inter-electrode voltage) that is applied to the discharge lamp varies according to an individual that is the discharge lamp. For this reason, in some cases, the life of the discharge lamp cannot be sufficiently prolonged with a drive method in which the individual difference of the discharge lamp cannot be considered.

SUMMARY

An advantage of some aspects of the invention is to provide a discharge lamp drive device that is capable of prolonging the life of a discharge lamp without depending on the individual difference of the discharge lamp, a light source device that is equipped with the discharge lamp drive device, and a projector that is equipped with the light source device. Furthermore, another advantage of some aspects of the invention is to provide a discharge lamp drive method that is capable of prolonging the life of a discharge lamp without depending on the individual difference of the discharge lamp.

An aspect of a discharge lamp drive device according to the invention includes: a discharge lamp driver configured to supply drive electric current to a discharge lamp having a first electrode and a second electrode; a control unit configured to control the discharge lamp driver; and a storage unit configured to store a plurality of drive patterns of the drive electric current, in which the control unit is configured to select one drive pattern, from among the plurality of drive patterns based on machine learning, and implement the selected drive pattern, and in which the control unit performs a first control that increases a drive electric power supplied to the discharge lamp according to an increase in an inter-electrode voltage of the discharge lamp, in a case where the inter-electrode voltage is equal to or larger than a first voltage value and the inter-electrode voltage is equal to or lower than a second voltage value that is higher than the first voltage value.

According to the aspect of the discharge lamp drive device according to the invention, the control unit selects any one drive pattern from among a plurality of drive patterns, based on machine learning, and implements the selected drive pattern. For this reason, even in a case where there is an individual difference of the discharge lamp, a suitable drive pattern can be selected according to the individual difference of the discharge lamp by performing the machine learning. Therefore, in the discharge lamp drive device according to the aspect of the embodiment, the life of the discharge lamp can be prolonged without depending on the individual difference of the discharge lamp.

Furthermore, because the drive pattern is selected based on the machine learning, even in a case where the drive electric power, which is to be supplied to the discharge lamp, is changed, a suitable drive pattern can be selected according to a change in the drive electric power. Accordingly, it is possible that the drive electric power, which is to be supplied to the discharge lamp, is easily changed in a stepwise manner. Furthermore, because it is possible that the drive electric power is voluntarily changed, it is also possible that the drive electric power is used as one drive parameter of the drive pattern that is changed when prolonging the life of the discharge lamp. Accordingly, the life of the discharge lamp can be more prolonged. Furthermore, even in a case where, like the first control, a control that changes the drive electric power according to a change in the inter-electrode voltage is performed, the life of the discharge lamp can be suppressed from being decreased.

Furthermore, according to the aspect of the discharge lamp drive device according to the invention, in the first control, the drive electric power that is to be supplied to the discharge lamp increases according to the increased in the inter-electrode voltage. For this reason, in a case where the inter-electrode voltage increases, the drive electric power can be increased and thus an amount of the drive electric current I that is to be supplied to the discharge lamp can be increased. Accordingly, while the first control is performed, although an accumulated lighting time increases, an illumination level maintenance ratio for the discharge lamp can be suppressed from decreasing. That is, while the first control is performed, an illumination level (brightness) of the discharge lamp can be maintained as constant. Therefore, the constant brightness can be provided to a user of the discharge lamp since the initial use of the discharge lamp. Moreover, a duration for use in a state where the illumination level maintenance ratio of the discharge lamp is relatively high can be easily extended, and the comfortableness for the user can be improved.

Furthermore, according to the aspect of the discharge lamp drive device according to the invention, even in a case where with the first control, the inter-electrode voltage changes, a value of the drive electric current can be suppressed from being lowered. Because of this, thermal load that is applied to the first electrode and the second electrode can be suppressed from decreasing. Therefore, sufficient thermal load is easy to apply to the first electrode and the second electrode, and a protrusion is easily caused to grow. As a result, the life of the discharge lamp can be prolonged. Furthermore, as described above, although the drive electric power is changed in this manner based on the change in the inter-electrode voltage, the life of the discharge lamp can be suppressed from being decreased, by using the machine learning.

The discharge lamp drive device may be configured such that, in the first control, the control unit supplies the drive electric current whose electric current value is constant, to the discharge lamp.

With this configuration, in a duration during which the first control is performed, the illumination level maintenance ratio for the discharge lamp can be easily maintained as constant. Accordingly, although the accumulated lighting time increases, the illumination level maintenance ratio for the discharge lamp can be more suppressed from decreasing, and the comfortableness for the user can be more improved.

The discharge lamp drive device may be configured such that the control unit performs a second control that maintains the drive electric power in such a manner as to be in a first given electric power range without depending on a value of the inter-electrode voltage, in a case where the inter-electrode voltage is lower than the first voltage value.

With this configuration, in a case where the inter-electrode voltage is below the first voltage value, the drive electric power can be suppressed from decreasing and a temperature within a discharge space can be suppressed from being lowered. Accordingly, the illumination level of the discharge lamp can be suppressed from being lowered. Furthermore, on the other hand, in a case where the inter-electrode voltage is below the first voltage value, although the drive electric power is maintained in a constant range, it is difficult for the lowering of the illumination level to take place. Therefore, with the configuration, the illumination level maintenance ratio for the discharge lamp can be more suppressed from being lowered, and the comfortableness for the user can be more improved.

The discharge lamp drive device may be configured such that the control unit sets the drive electric power, which is to be supplied to the discharge lamp in the first control to be at a given electric power value, in a case where the inter-electrode voltage is at the first voltage value in the first control, and the control unit maintains the drive electric power supplied to the discharge lamp at the given electric power value in the second control.

With this configuration, in a case where the inter-electrode voltage is at a value in the vicinity of the first voltage value, the illumination level of the discharge lamp in the second control is approximately the same as the illumination level of the discharge lamp in the first control. At this point, in a case where the inter-electrode voltage is below the first voltage value, the value of the inter-electrode voltage easily reaches the vicinity of the first voltage value. For this reason, switching between the first control and the second control is performed, and thus while the first control or the second control is performed, the illumination level of the discharge lamp is maintained as approximately constant, and the comfortableness for the user can be suppressed from decreasing. That is, the switching between the first control and the second control is performed, and thus while the first control or the second control is performed, the illumination level of the discharge lamp can be maintained as approximately constant.

The discharge lamp drive device may be configured such that the first voltage value is a value of an inter-electrode voltage in an initial stage for the discharge lamp.

With this configuration, the illumination level of the discharge lamp can be maintained as constant, from the initial stage where the discharge lamp starts to be used, and the comfortableness for the user can be more improved.

The discharge lamp drive device may be configured such that the first voltage value is a value that is higher than a value of an inter-electrode voltage in an initial stage for the discharge lamp.

With this configuration, the drive electric power that is to be supplied to the discharge lamp can be increased in a stage (for example, in the last stage) that is later than the initial stage for the discharge lamp. Therefore, for example, in the last stage for the discharge lamp, the illumination level of the discharge lamp can be relatively maintained, and thus the comfortableness for the user can be improved.

The discharge lamp drive device may be configured such that the control unit performs a third control that maintains the drive electric power in a second given electric power range without depending on a value of the inter-electrode voltage, in a case where the inter-electrode voltage is larger than the second voltage value.

With this configuration, the drive electric power that is to be supplied to the discharge lamp can be suppressed from excessively increasing, and the life of the discharge lamp can be suppressed from being decreased.

The discharge lamp drive device may be configured such that the control unit increases the drive electric power supplied to the discharge lamp in the first control up to a rating electric power value for the discharge lamp, in a case where the inter-electrode voltage is at the second voltage value in the first control, and the control unit maintains the drive electric power supplied to the discharge lamp at the rating electric power value in the third control.

With this configuration, in a case where the inter-electrode voltage is at a value in the vicinity of the second voltage value, the illumination level of the discharge lamp in the third control is approximately the same as the illumination level of the discharge lamp in the first control. Accordingly, when the switching from the first control to the third control is performed, the illumination level of the discharge lamp can be suppressed from changing abruptly and the comfortableness for the user can be suppressed from decreasing. Furthermore, because the drive electric power to be maintained is at a rating electric power value, a value of the drive electric power that is to be applied to the discharge lamp can be suitably maintained, and the life of the discharge lamp can be suppressed from being decreased.

The discharge lamp drive device may be configured such that protrusions are formed on a head of the first electrode and a head of the second electrode, respectively, and the control unit increases the drive electric power in a case where a movement of the protrusion is detected.

With this configuration, in a case where the movement of the protrusion takes place, the protrusion easily returns to its original position. Because of this, the inter-electrode voltage that undergoes a change due to the movement of the protrusion easily returns to its original state. Therefore, even in a case where, in the machine learning, evaluation of the drive pattern is made based on only the change in the inter-electrode voltage, the drive pattern is easy to evaluate suitably. As a result, the life of the discharge lamp can be more prolonged.

The discharge lamp drive device may be configured such that the discharge lamp drive device further includes a first detection unit and a second detection unit that are positioned in such a manner that an optical axis of a light emitted from the discharge lamp is interposed between the first detection unit and the second detection unit, the first detection unit and the second detection unit are configured to measure at least one of a temperature and an illumination level, and the control unit detects the movement of the protrusion and increases the drive electric power, based on a result of the measurement by the first detection unit and a result of the measurement by the second detection unit.

With this configuration, the thermal load that is applied to the first electrode and the second electrode can be increased, and a range of melting of, and an amount of melting, of the protrusion can be increased. Therefore, when the melted protrusion is reformed, it is easy for the protrusion to return to its normal position. As described above, with this configuration, in a case where the movement of the protrusion takes place, the protrusion easily returns to its original position. Because of this, the inter-electrode voltage that undergoes a change due to the movement of the protrusion easily returns to its original state. Therefore, even in the case where, in the machine learning, the evaluation of the drive pattern is made based on only the change in the inter-electrode voltage, the drive pattern is easy to evaluate suitably. As a result, the life of the discharge lamp can be more prolonged.

The discharge lamp drive device may be configured such that the first detection unit and the second detection unit measure the temperature, and the control unit detects the movement of the protrusion and increases the drive electric power, in a case where a difference between the temperature measured by the first detection unit and the temperature measured by the second detection unit changes.

With this configuration, the movement of the protrusion is easily detected.

The discharge lamp drive device may be configured such that the first detection unit and the second detection unit measure the illumination level, and the control unit detects the movement of the protrusion and increases the drive electric power, in a case where a difference between the illumination level measured by the first detection unit and the illumination level measured by the second detection unit changes.

With this configuration, the movement of the protrusion is easily detected.

An aspect of a light source device according to the invention includes a discharge lamp configured to emit a light; and the discharge lamp drive device described above.

According to the aspect of the light source device according to the invention, because the above-described discharge lamp drive device is included, the life of the discharge lamp can be prolonged in the same manner as described above.

An aspect of a projector according to the invention includes: the light source device described above; a light modulation device configured to modulate the light emitted from the light source device according to an image signal; and a projection optical system configured to project the light modulated by the light modulation device.

According to the aspect of the projector according to the invention, because the above-described light source device is included, the life of the discharge lamp can be prolonged in the same manner as described above.

The projector may be configured such that the projector further includes a light polarization element that is positioned on a light incident side on the light modulation device, a holding frame holding the light polarization element and a first detection unit and a second detection unit that are positioned in such a manner that an optical axis of a light which is emitted from the discharge lamp and is incident on the light polarization element is interposed between the first detection unit and the second detection unit, the first detection unit and the second detection unit measure at least one of a temperature and an illumination level, and are positioned on the holding frame on the same side as in a light incident side of the light polarization element, and the control unit increases the drive electric power based on a result of the measurement by the first detection unit and a result of the measurement by the second detection unit.

With this configuration, the movement of the protrusion is more easily detected.

An aspect of a discharge lamp drive method according to the invention is a discharge lamp drive method configured to supply drive electric current to a discharge lamp having a first electrode and a second electrode to drive the discharge lamp, the method including: selecting one drive pattern from among a plurality of drive patterns of the drive electric current based on the machine learning; implementing the selected drive pattern; and performing a first control that increases a drive electric power supplied to the discharge lamp according to an increase in an inter-electrode voltage of the discharge lamp, in a case where the inter-electrode voltage is equal to or larger than a first voltage value and the inter-electrode voltage is equal to or lower than a second voltage value that is higher than the first voltage value.

According to the aspect of the discharge lamp drive method according to the invention, the life of the discharge lamp can be prolonged in the same manner as described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to the invention will be described below with reference to the drawings.

It is noted that the scope of the invention is not limited to the following embodiments and that any modification to the invention is possible within the scope of the technical idea behind the invention. Furthermore, for easy understanding of each configuration, in some cases, an actual structure and each structure in the following drawings are different from each other in terms of scale, number, or the like.

First Embodiment

Figure 1:
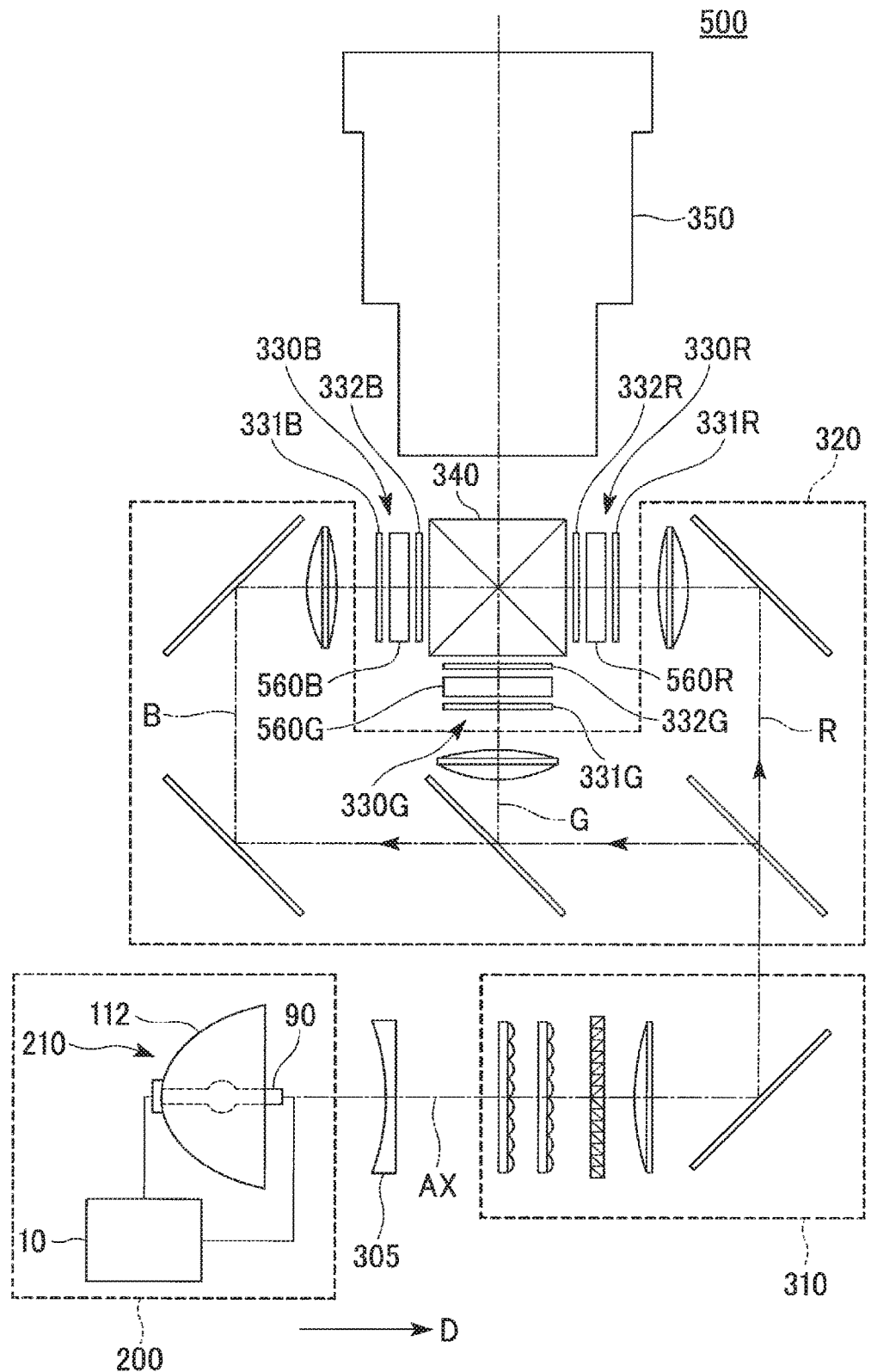
FIG. 1 is a schematic configuration diagram illustrating a projector according to a first embodiment.

FIG. 1 is a schematic configuration diagram illustrating a projector 500 according to the present embodiment. As illustrated in FIG. 1, the projector 500 according to the present embodiment includes a light source device 200, a collimating lens 305, an illumination optical system 310, a color separation optical system 320, three liquid crystal light valves, including liquid crystal light valves 330R, 330G, and 330B, a cross dichroic prism 340, and a projection optical system 350.

A light that is emitted from the light source device 200 passes through the collimating lens 305 and is incident on the illumination optical system 310. The collimating lens 305 collimates the light from the light source device 200.

The illumination optical system 310 adjusts an illumination level of the light that is emitted from the light source device 200, in a manner that is uniform on the liquid crystal light valves 330R, 330G, and 330B. Moreover, the illumination optical system 310 arranges polarization directions of the light that is emitted from the light source device 200, in one direction. The reason is because the light that is emitted from the light source device 200 is effectively used in the liquid crystal light valves 330R, 330G, and 330B.

The light whose illumination level distribution and polarization direction are adjusted is incident on the color separation optical system 320. The color separation optical system 320 separates the incident light into three color lights, red light (R), green light (G), blue light (B). The three color lights are modulated by the liquid crystal light valves 330R, 330G, and 330B, which correspond to the three color lights themselves, respectively, according to an image signal. The liquid crystal light valves 330R, 330G, and 330B include liquid crystal panels (light modulation devices) 560R, 560G, and 560B, incidence-side polarization plates 331R, 331G, and 331B, and emission-side polarization plates 332R, 332G, and 332B, respectively. The incidence-side polarization plates (light polarization elements) 331R, 331G, and 331B are positioned to the sides (light incidence sides), respectively, of the liquid crystal panels 560R, 560G, and 560B, on which a light is incident. The emission-side polarization plates 332R, 332G, and 332B are positioned to the sides (light emission sides) of the liquid crystal panels 560R, 560G, and 560B, from which a light is emitted.

The three modulated color lights are combined by the cross dichroic prism 340. A composite light is incident on the projection optical system 350. The projection optical system 350 projects the incident light onto a screen 700 (refer to FIG. 3). Accordingly, an image is displayed on the screen 700. It is noted that, as a configuration of each of the collimating lens 305, the illumination optical system 310, the color separation optical system 320, cross dichroic prism 340, and the projection optical system 350, a well-known configuration can be employed.

Figure 2:
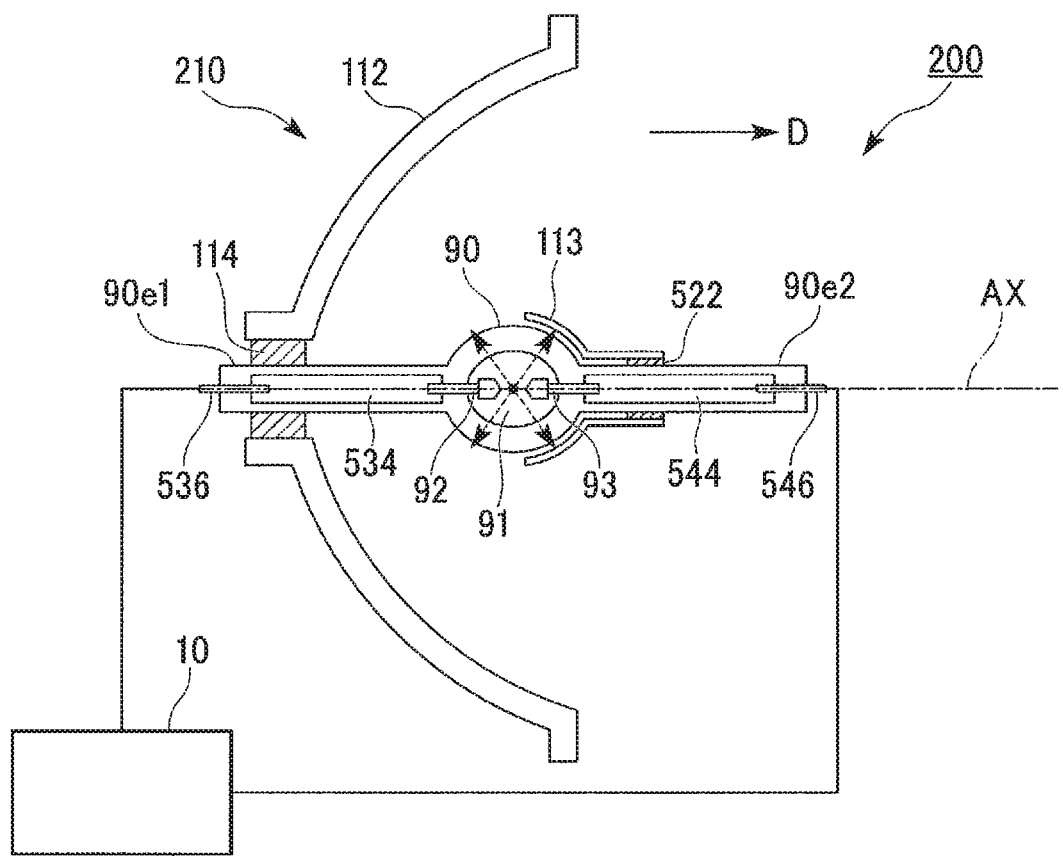
FIG. 2 is a diagram illustrating a discharge lamp in the first embodiment.

FIG. 2 is a cross-sectional diagram illustrating a configuration of the light source device 200. The light source device 200 includes a light source unit 210 and a discharge lamp lighting device (electric discharge lamp drive device) 10. In FIG. 2, a cross-section of the light source unit 210 is illustrated. The light source unit 210 includes a main reflecting mirror 112, a discharge lamp 90, and a sub-reflecting mirror 113.

An discharge lamp lighting device 10 supplies drive electric current I to the discharge lamp 90 and lights up the discharge lamp 90. The main reflecting mirror 112 reflects the light that is released from the discharge lamp 90, toward an irradiation direction D. The irradiation direction D is in parallel with an optical axis AX of the discharge lamp 90.

The discharge lamp 90 is in the form of a rod that extends along the irradiation direction D. One end portion of the discharge lamp 90 is defined as a first end portion 90e1, and the other end portion of the discharge lamp 90 is defined as a second end portion 90e2. A material of the discharge lamp 90 is, for example, a transmissive material such as quartz glass. The center portion of the discharge lamp 90 expands into the shape of a sphere, and the inside of the center portion is a discharge space 91. Gas that is a discharge medium that includes rare gas, a metal halogen compound, or the like is enclosed in the discharge space 91.

Heads of a first electrode 92 and a second electrode 93 protrude into the discharge space 91. The first electrode 92 is positioned to the first end portion 90e1 side of the discharge space 91. The second electrode 93 is positioned to the second end portion 90e2 side of the discharge space 91. The first electrode 92 and the second electrode 93 are in the form of a rod that extends along the optical axis AX. Electrode head portions of the first electrode 92 and the second electrode 93 are positioned by a given distance apart in a manner that faces each other, in the discharge space 91. Materials of the first electrode 92 and the second electrode 93 are, for example, a metal such as tungsten.

A first terminal 536 is provided in the first end portion 90e1 of the discharge lamp 90. The first terminal 536 and the first electrode 92 are electrically connected by the conductive member 534 that pierces through the discharge lamp 90. In the same manner, a second terminal 546 is provided in the second end portion 90e2 of the discharge lamp 90. The second terminal 546 and the second electrode 93 are electrically connected by a conductive member 544 that pierces through the discharge lamp 90. Materials of the first terminal 536 and the second terminal 546 are, for example, a metal such as tungsten. As materials of the conductive members 534 and 544, for example, a molybdenum foil is used.

The first terminal 536 and the second terminal 546 are connected to the discharge lamp lighting device 10. The discharge lamp lighting device 10 supplies the drive electric current I for driving the discharge lamp 90, to the first terminal 536 and the second terminal 546. As a result, arc discharge occurs between the first electrode 92 and the second electrode 93. A light that occurs by the arc discharge (discharge light), as illustrated in a broken-line arrow, is radiated from a discharge position toward all directions.

The main reflecting mirror 112 is fixed by the fixation member 114 to the first end portion 90e1 of the discharge lamp 90. The main reflecting mirror 112 reflects a light that travels toward a direction opposite to the irradiation direction D, among discharge lights to the irradiation direction D. A form of a reflection surface (the discharge lamp 90 side surface) of the main reflecting mirror 112 is in a size range where the discharge light can be reflected toward the irradiation direction D. Without any particular limitation, for example, the reflection surface may be in the form of a revolving ellipsoid and may be in the form of a revolving parabola. For example, in a case where the reflection surface of the main reflecting mirror 112 is in the form of a revolving parabola, the main reflecting mirror 112 can convert the discharge light into a light that travels in parallel with the optical axis AX. Accordingly, the collimating lens 305 can be omitted.

The sub-reflecting mirror 113 is fixed by a fixation member 522 to the second end portion 90e2 side of the discharge lamp 90. A reflection surface (the discharge lamp 90 side surface) of the sub-reflecting mirror 113 is in the form of a spherical surface that surrounds the second end portion 90e2 side portion of the discharge space 91. The sub-reflecting mirror 113 reflects a light that travels toward a direction opposite to a direction in which the main reflecting mirror 112 is positioned, among the discharge lights, toward the main reflecting mirror 112. Accordingly, utilization efficiency of the light that is radiated from the discharge space 91 can be increased.

Materials of the fixation members 114 and 522 are in a range of heat-resistant materials that are resistant to heat that occurs from the discharge lamp 90, and, for example, are an inorganic adhesive without any particular limitation. As a method of fixedly positioning the main reflecting mirror 112 and the sub-reflecting mirror 113, and the discharge lamp 90, any method can be employed without being limited to a method of fixing the main reflecting mirror 112 and the sub-reflecting mirror 113 to the discharge lamp 90. For example, the discharge lamp 90 and the main reflecting mirror 112 may be independently fixed to a casing (not illustrated) of the projector 500. The same is also true for the sub-reflecting mirror 113.

A circuit configuration of the projector 500 will be described below.

Figure 3:
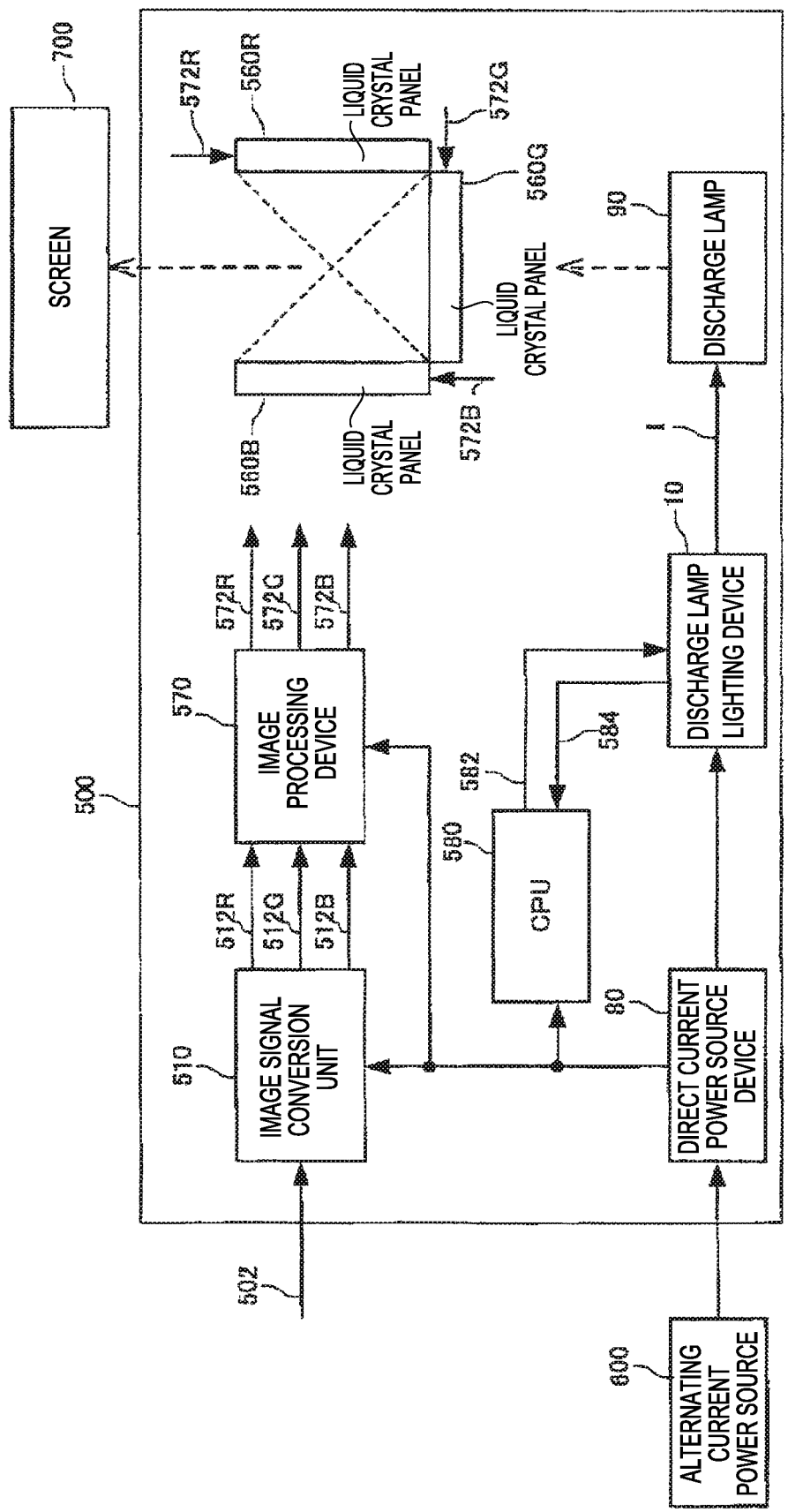
FIG. 3 is a block diagram illustrating various constituent elements of the projector according to the first embodiment.

FIG. 3 is a diagram illustrating an example of the circuit configuration of the projector 500 according to the present embodiment. In addition to an optical system that is illustrated in FIG. 1, the projector 500 includes an image signal conversion unit 510, a direct current power source device 80, the liquid crystal panels 560R, 560G, and 560B, an image processing device 570, and a central processing unit (CPU) 580.

The image signal conversion unit 510 converts an image signal 502 (a luminance—color difference signal, an analog RGB signal, or the like) that is input from the outside, into a digital RGB signal having a given word length, and thus generates image signals 512R, 512G, and 512B, and supplies the generated image signals to the image processing device 570.

The image processing device 570 performs image processing on each of the three image signals, including the image signals 512R, 512G, and 512B. The image processing device 570 supplies drive signals 572R, 572G, and 572B for driving the liquid crystal panels 560R, 560G, and 560B to the liquid crystal panels 560R, 560G, and 560B, respectively.

The direct current power source device 80 converts an alternating current voltage that is supplied from an external alternating current power source 600, into a constant direct current voltage. The direct current power source device 80 supplies the direct current voltage to the image signal conversion unit 510 and the image processing device 570 that are positioned to the secondary side of a transformer (is not illustrated, but is included in the direct current power source device 80), and the discharge lamp lighting device 10 that is positioned to the primary side of the transformer.

The discharge lamp lighting device 10, which is activated, generates a high voltage between electrodes of the discharge lamp 90, causes dielectric breakdown, and thus forms a discharge path. Thereafter, the discharge lamp lighting device 10 supplies the drive electric current I necessary for the discharge lamp 90 to maintain discharge.

The liquid crystal panels 560R, 560G, and 560B are included in the liquid crystal light valves 330R, 330G, and 330B, respectively, which are described above. The liquid crystal panels 560R, 560G, and 560B modulate transmittances (luminances) of the color lights that are incident on the liquid crystal panels 560R, 560G, and 560B through the optical system described above, based on the drive signals 572R, 572G, and 572B, respectively. That is, the liquid crystal panels 560R, 560G, and 560B modulate lights that pass through them, according to the image signals 512R, 512G, and 512B, respectively.

The CPU 580 controls various operations that range from an operation of starting to light up the projector 500 to an operating of lighting out the projector 500. For example, in an example in FIG. 3, a lighting-up command or a lighting-out command is output to the discharge lamp lighting device 10 through a communication signal 582. The CPU 580 receives information on the lighting-up of the discharge lamp 90 from the discharge lamp lighting device 10 through the communication signal 584.

A configuration of the discharge lamp lighting device 10 will be described below.

Figure 4:
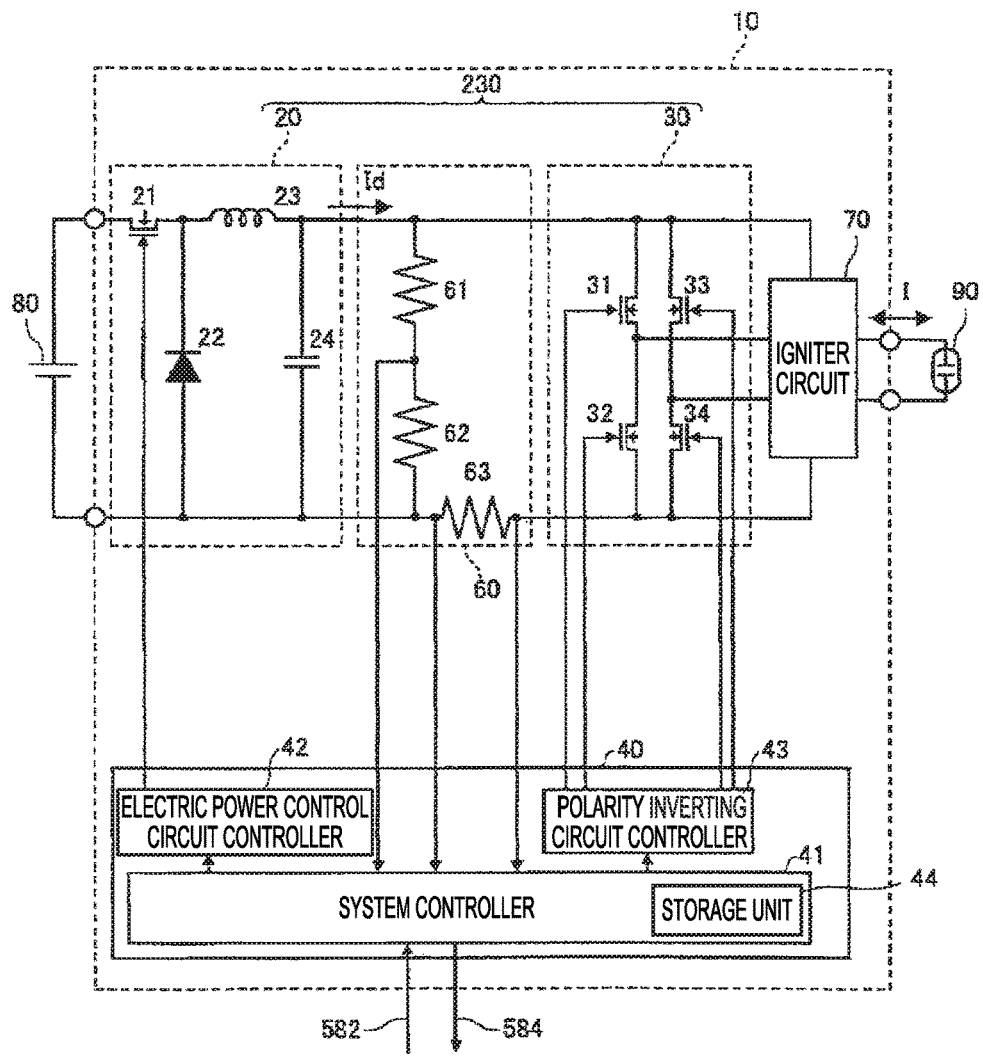
FIG. 4 is a circuit diagram of a discharge lamp lighting device according to the first embodiment.

FIG. 4 is a diagram illustrating an example of a circuit configuration of the discharge lamp lighting device 10.

The discharge lamp lighting device 10, as illustrated in FIG. 4, includes an electric power control circuit 20, a polarity inverting circuit 30, a control unit 40, an operation detection unit 60, and an igniter circuit 70.

The electric power control circuit 20 generates a drive electric power Wd that is to be supplied to the discharge lamp 90. In the present embodiment, the electric power control circuit 20 is configured with a down-chopper circuit into which a voltage from the direct current power source device 80 is input and which steps down the input voltage and thus outputs direct electric current Id.

The electric power control circuit 20 is configured to include a switching element 21, a diode 22, a coil 23, and a capacitor 24. The switching element 21, for example, is configured with a transistor. In the present embodiment, one end of the switching element 21 is connected to the positive voltage side of the direct current power source device 80, and the other end is connected to a cathode terminal of the diode 22 and one end of the coil 23.

One end of the capacitor 24 is connected to the other end of the coil 23, and the other end of the capacitor 24 is connected to an anode terminal of the diode 22 and the negative voltage side of the direct current power source device 80. An electric current control signal from the control unit 40 that will be described below is input into a control terminal of the switching element 21, and turning-on and turning-off of the switching element 21 are controlled. For example, a pulse width modulation (PWN) control signal may be used for the electric current control signal.

When the switching element 21 is turned on, electric current flows through the coil 23, and energy is stored up in the coil 23. Thereafter, when the switching element 21 is turned off, the energy that is stored up in the coil 23 is released along a path between the capacitor 24 and the diode 22. As a result, the direct electric current Id in accordance with a time ratio at which the switching element 21 is turned on occurs.

The polarity inverting circuit 30 inverts a polarity of the direct electric current Id that is input from the electric power control circuit 20, at a given timing. Accordingly, the polarity inverting circuit 30 generates and outputs the drive electric current I that is direct current which continues only for a controlled time, or the drive electric current I that is alternating current which has any periodicity. In the present embodiment, the polarity inverting circuit 30 is configured with an inverter bridge circuit (a full bridge circuit).

The polarity inverting circuit 30, for example, includes a first switching element 31, a second switching element 32, a third switching element 33, and a fourth switching element 34, each of which is configured with a transistor and the like. The polarity inverting circuit 30 has a configuration in which the first switching element 31 and the second switching element 32 that are serially connected, and the third switching element 33 and the fourth switching element 34 that are serially connected are connected in parallel. A polarity inverting control signal from the control unit 40 is input into a control terminal of each of the control terminals of the first switching element 31, the second switching element 32, the third switching element 33, and the fourth switching element 34. Based on the polarity inverting control signal, operations of turning on and turning off the first switching element 31, the second switching element 32, the third switching element 33, and the fourth switching element 34 are controlled.

In the polarity inverting circuit 30, an operation of alternately turning on and turning off the first switching element 31 and the fourth switching element 34, and the second switching element 32 and the third switching element 33 is repeated. Accordingly, polarities of the direct electric current Id that is output from the electric power control circuit 20 are alternately inverted. The polarity inverting circuit 30 generates and outputs the drive electric current I that is direct current which continues the same polarity state only for a controlled time, or the drive electric current I that is alternating current which has a control frequency, from a connection point that is shared between the first switching element 31 and the second switching element 32, and a connection point that is shared between the third switching element 33 and the fourth switching element 34.

That is, the polarity inverting circuit 30 is controlled in such a manner that the second switching element 32 and the third switching element 33 are turned off when the first switching element 31 and the fourth switching element 34 are turned on and in such a manner that the second switching element 32 and the third switching element 33 are turned on when the first switching element 31 and the fourth switching element 34 are turned off. Therefore, when the first switching element 31 and the fourth switching element 34 are turned on, the drive electric current I occurs that is to flow from one end of the capacitor 24 through the first switching element 31, the discharge lamp 90, and the fourth switching element 34 in this order. When the second switching element 32 and the third switching element 33 are turned on, the drive electric current I occurs that is to flow from one end of the capacitor 24 through the third switching element 33, the discharge lamp 90, and the second switching element 32 in this order.

In the present embodiment, a portion that results from combining the electric power control circuit 20 and the polarity inverting circuit 30 corresponds to a discharge lamp driver 230. That is, the discharge lamp driver 230 supplies the drive electric current I that drives the discharge lamp 90 to the discharge lamp 90.

The control unit 40 controls the discharge lamp driver 230. In an example in FIG. 4, the control unit 40 controls the electric power control circuit 20 and the polarity inverting circuit 30, and thus controls the time for which the drive electric current I continues to retain the same polarity, an electric current value (an electric power value of the drive electric power Wd) of the drive electric current I, and a parameter for a frequency or the like. The control unit 40 performs the polarity inverting control that controls the time for which the drive electric current I continues to retain the same polarity, and a frequency and the like of the drive electric current I, on the polarity inverting circuit 30, at a polarity inverting timing for the drive electric current I. The control unit 40 performs electric current control that controls an electric current value of the direct electric current Id that is output, on the electric power control circuit 20.

The control unit 40 in the present embodiment, for example, possibly performs an alternating current drive and a direct current drive. The alternating current drive is a drive for supplying alternating electric current to the discharge lamp 90. The direct current drive is a drive for supplying direct electric current to the discharge lamp 90. A drive electric current waveform of the drive electric current I that, with each discharge lamp drive, is supplied to the discharge lamp 90 will be described below.

A configuration of the control unit 40 is not particularly limited. In the present embodiment, the control unit 40 is configured to include a system controller 41, an electric power control circuit controller 42, and a polarity inverting circuit controller 43. It is noted that one or several portions, or all portions of the control unit 40 may be configured with a semiconductor integrated circuit.

The system controller 41 controls the electric power control circuit controller 42 and the polarity inverting circuit controller 43, and thus controls the electric power control circuit 20 and the polarity inverting circuit 30. The system controller 41 may control the electric power control circuit controller 42 and the polarity inverting circuit controller 43 based on a lamp voltage (an inter-electrode voltage) Vla and the drive electric current I that are measured by the operation detection unit 60.

In the present embodiment, a storage unit 44 is connected to the system controller 41.

Based on information that is stored in the storage unit 44, the system controller 41 may control the electric power control circuit 20 and the polarity inverting circuit 30. A plurality of drive patterns DW of the drive electric current I are stored in the storage unit 44. More specifically, for example, pieces of information relating to each drive that constitutes each drive pattern DW, and relating to drive parameters, such as a length of time for which the drive is performed, an electric current value of the drive electric current I, a frequency, a periodicity, a polarity, a waveform, and a modulation pattern, are stored in the storage unit 44. Each drive pattern DW of the drive electric current I includes at least one of the alternating current drive and the direct current drive, which are described above. The drive pattern DW will be described in detail below.

Based on a control signal from the system controller 41, the electric power control circuit controller 42 outputs the electric current control signal to the electric power control circuit 20, and thus controls the electric power control circuit 20.

Based on the control signal from the system controller 41, the polarity inverting circuit controller 43 outputs the polarity inverting control signal to the polarity inverting circuit 30, and thus controls the polarity inverting circuit 30.

The control unit 40 performs machine learning. The control unit 40 selects any one drive pattern DW from among a plurality of drive patterns DW that are stored in the storage unit 44, based on the machine learning, and implements the selected drive pattern DW. The machine learning will be described in detail below.

The control unit 40 can be realized using a dedicated circuit, and can be set to perform the control described above or various controls of processing operations that will be described below. In contrast, the control unit 40, for example, can function as a computer by the CPU executing a control program that is stored in the storage unit 44, and can also be set to perform various controls of these processing operations.

Figure 5:
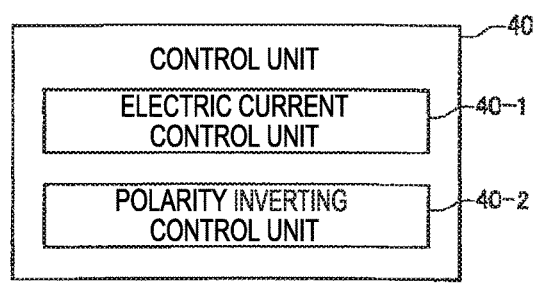
FIG. 5 is a block diagram illustrating an example of a configuration of a control unit according to the first embodiment.

FIG. 5 is a diagram for describing another example of the configuration of the control unit 40. As illustrated in FIG. 5, with a control program, the control unit 40 may be configured in such a manner as to function as an electric current control unit 40-1 that controls the electric power control circuit 20 and a polarity inverting control unit 40-2 that controls the polarity inverting circuit 30.

In an example that is illustrated in FIG. 4, the control unit 40 is configured as one portion of the discharge lamp lighting device 10. In contrast, a configuration may be employed in which a CPU 580 plays a role in performing one portion of a function of the control unit 40.

In the present embodiment, the operation detection unit 60 includes a voltage measurement unit that measures a lamp voltage Vla of the discharge lamp 90 and outputs lamp voltage information to the control unit 40. Furthermore, the operation detection unit 60 may include an electric current measurement unit or the like that measures the drive electric current I and outputs drive electric current information to the control unit 40. In the present embodiment, the operation detection unit 60 is configured to include a first resistor 61, a second resistor 62, and a third resistor 63.

In the present embodiment, with a voltage that results from voltage division in the first resistor 61 and the second resistor 62, which is serially connected to each other in a manner that is in parallel with the discharge lamp 90, the voltage measurement unit of the operation detection unit 60 measures the lamp voltage Vla. Furthermore, in the present embodiment, with a voltage that occurs in the third resistor 63 that is serially connected to the discharge lamp 90, the electric current measurement unit measures the drive electric current I.

The igniter circuit 70 operates only when the discharge lamp 90 starts to be lighted up. The igniter circuit 70 supplies a high voltage (a voltage that is higher than when the discharge lamp 90 usually starts to be lighted up) necessary for causing the dielectric breakdown between the electrodes (between the first electrode 92 and the second electrode 93) of the discharge lamp 90 and forming the discharge path when the discharge lamp 90 starts to be lighted up, between the electrodes (between the first electrode 92 and the second electrode 93) of the discharge lamp 90. In the present embodiment, the igniter circuit 70 is connected in parallel to the discharge lamp 90.

Figure 6A:
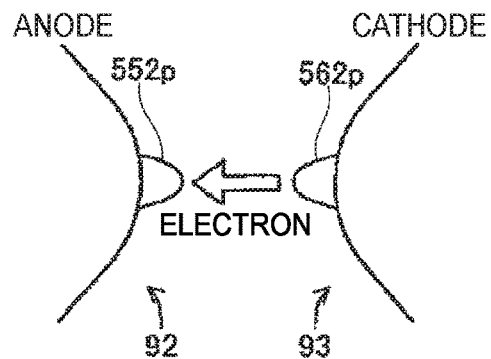
FIG. 6A is a diagram illustrating a state of a protrusion on an electrode head portion of the discharge lamp.
Figure 6B:
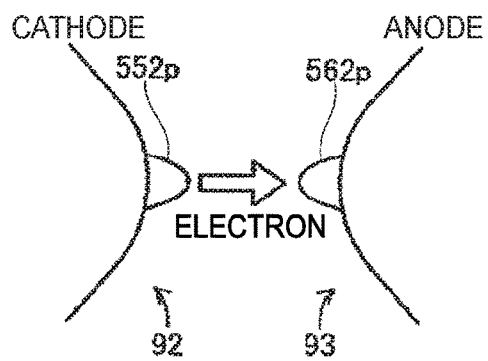
FIG. 6B is a diagram illustrating the state of the protrusion on the electrode head portion of the discharge lamp.

In FIGS. 6A and 6B, head portions of the first electrode 92 and the second electrode 93 are illustrated. Protrusions 552p and 562p are formed on heads of the first electrode 92 and the second electrode 93, respectively. The arc discharge in the discharge lamp 90 described above occurs between the protrusion 552p of the first electrode 92 and the protrusion 562p of the second electrode 93. FIG. 6A illustrates a first polarity state in which the first electrode 92 operates as an anode and the second electrode 93 operates as a cathode. In the first polarity state, with the discharge, an electron moves from the second electrode 93 (a cathode) to the first electrode 92 (an anode). The electron is released from the cathode (the second electrode 93). The electron that is released from the cathode (the second electrode 93) collides with a head of the anode (the first electrode 92). Due to the collision, heat occurs and a temperature of the head (the protrusion 552p) of the anode (the first electrode 92) rises.

FIG. 6B illustrates a second polarity state in which the first electrode 92 operates as the cathode and the second electrode 93 operates as the anode. In the second polarity state, unlike in the first polarity state, an electron moves from the first electrode 92 to the second electrode 93 in the reverse direction. As a result, a temperature rises in the head (the protrusion 562p) of the second electrode 93.

In this manner, the drive electric current I is supplied to the discharge lamp 90, and thus a temperature rises in the anode in which electrons collide with each other. On the other hand, the cathode that releases an electron drops in a temperature while an electron is released toward the anode.

A distance between the first electrode 92 and the second electrode 93 increases with degradation in the protrusions 552p and 562p. This is because the protrusions 552p and 562p are worn out. When the distance between the electrodes increases, resistance between the first electrode 92 and the second electrode 93 increases, and because of this, the lamp voltage Vla increases. Therefore, with reference to the lamp voltage Vla, a change in the distance between the electrodes, that is, the degree of a degradation in the discharge lamp 90 can be measured.

It is noted that in some cases, because the first electrode 92 and the second electrode 93 have the same configuration, only the first electrode 92 is representatively described below. Furthermore, in some cases, because the protrusion 552p of the head of the first electrode 92, and the protrusion 562p of the head of the second electrode 93 have the same configuration, only the protrusion 552p is representatively described below.

Control of the discharge lamp driver 230 by the control unit 40 according to the present embodiment will be described below. With at least one of the alternating current drive and the direct current drive, the control unit 40 in the present embodiment controls the discharge lamp driver 230.

The control unit 40 in the present embodiment possibly performs a plurality of drive patterns DW each of which results from combining one or more drives that will be described below. Regarding each drive pattern DW in the present embodiment, at least one among the drive parameters in each drive that constitutes the drive pattern DW has drive electric current waveforms which are different from each other.

Figure 7:
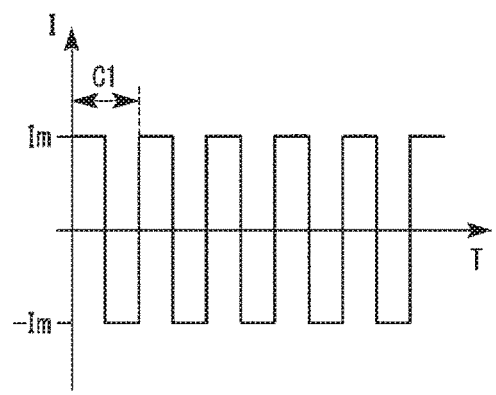
FIG. 7 is a diagram illustrating an example of a drive electric current waveform that is supplied to the discharge lamp in an alternating current drive according to the first embodiment.
Figure 8A:
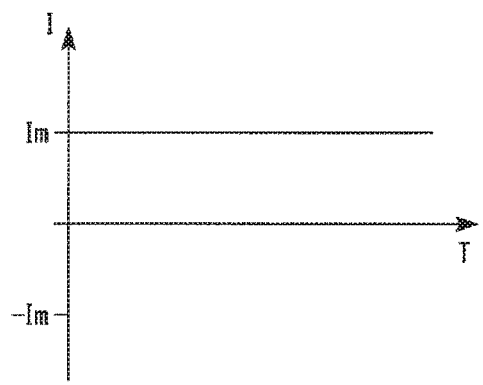
FIG. 8A is a diagram illustrating an example of the drive electric current waveform that is supplied to the discharge lamp in a direct current drive according to the first embodiment.
Figure 8B:
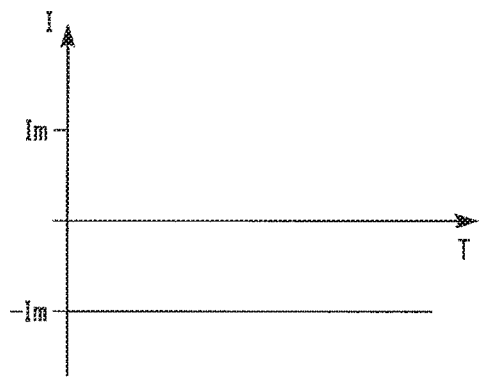
FIG. 8B is a diagram illustrating an example of the drive electric current waveform that is supplied to the discharge lamp in the direct current drive according to the first embodiment.

Each drive will be described below. FIG. 7 is a diagram illustrating an example of the drive electric current waveform that is supplied to the discharge lamp 90 in the alternating current drive. FIGS. 8A and 8B are diagrams each illustrating an example of the drive electric current waveform that is supplied to the discharge lamp 90 in the direct current drive. In FIGS. 7, 8A and 8B, the vertical axis represents the drive electric current I, and the horizontal axis represents time T. It is illustrated that the drive electric current I is set to be positive in the case of the first polarity state and is set to be negative in the case of the second polarity state.

The drive electric current I that is supplied to the discharge lamp 90 in the alternating current drive that is illustrated in FIG. 7, for example, is rectangular-wave alternating electric current of which a polarity is inverted a plurality of times between an electric current value Im and an electric current value −Im. In the alternating electric current that is illustrated in FIG. 7, a length of a periodicity C1 is constant. A duty ratio of the alternating electric current that is illustrated in FIG. 7 is 0.5 (50%).

The drive electric current I that is supplied to the discharge lamp 90 in the direct current drive that is illustrated in FIG. 8A is the direct electric current at the first polarity having a constant electric current value Im. The drive electric current I that is supplied to the discharge lamp 90 in the direct current drive that is illustrated in FIG. 8B is that direct electric current at a second polarity having a constant electric current value −Im.

Figure 9:
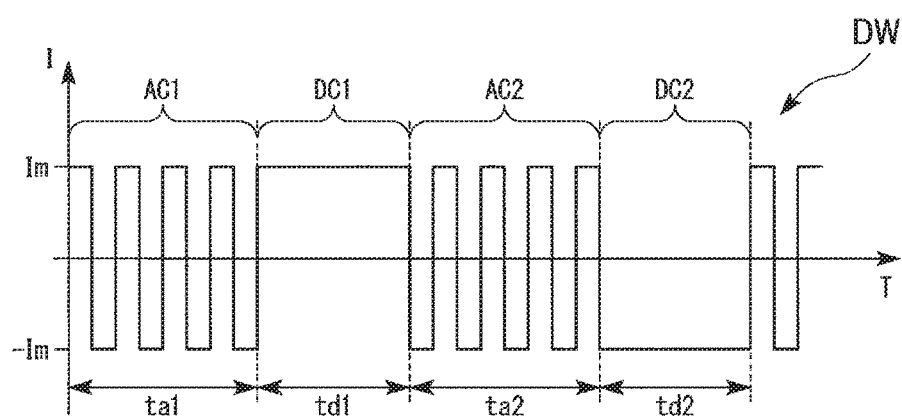
FIG. 9 is a diagram illustrating an example of a drive pattern of drive electric current that is supplied to the discharge lamp in the first embodiment.

FIG. 9 is a diagram illustrating an example of the drive pattern DW of the drive electric current I that is supplied to the discharge lamp 90 in the present embodiment. In FIG. 9, the vertical axis represents the drive electric current I, and the horizontal axis represents time T.

The drive pattern DW that is illustrated in FIG. 9 is configured from the alternating current drive and the direct current drive. More specifically, the drive pattern DW in FIG. 9 is configured from a first alternating current drive AC1, a first direct current drive DC1, a second alternating current drive AC2, and a second direct current drive DC2. Then, the drive pattern DW has a plurality of drive parameters relating to each alternating current drive and each direct current drive. For example, the first alternating current drive AC1 has a length ta1 of the time for performing the alternating current drive, and a first frequency f1 of the alternating electric current, as the drive parameters. The first direct current drive DC1 has a length td1 of the time for performing the direct current drive and the first polarity, as the drive parameters. For example, the second alternating current drive AC2 has a length ta2 of the time for performing the alternating current drive, and a second frequency f2 of the alternating electric current, as the drive parameters. The second direct current drive DC2 has a length td2 of the time for performing the direct current drive and the second polarity, as the drive parameters.

It is noted that, in the case of the drive pattern DW in FIG. 9, the length ta1 of the time for performing the first alternating current drive AC1 and the length ta2 of the time for performing the second alternating current drive AC2 are the same, and further that the length td1 of the time for performing the first direct current drive DC1 and the length td1 of the time for performing the second direct current drive DC2 are the same. Moreover, in the case of the drive pattern DW in FIG. 9, the first frequency f1 of the alternating electric current in the first alternating current drive AC1, and the second frequency f2 of the alternating electric current in the second alternating current drive AC2 are the same.

The first frequency f1 and the second frequency f2, for example, are equal to or higher 100 Hz and are equal to or lower than 1 kHz. The length ta1 of the time for performing the first alternating current drive AC1 and the length to 2 of the time for performing the second alternating current drive AC2, for example, are equal to or longer than 10 ms (millisecond) and are equal to or shorter than 10 s (second). The length td1 of the time for performing the first direct current drive DC1 and the length td2 of the time for performing the second direct current drive DC2, for example, are equal to or longer than 10 ms (millisecond) and are equal to or shorter than 40 ms (millisecond).

A plurality of drive patterns DW, for example, are configured by suitably combining a plurality of numerical values that are selected from a range of numeral values of each drive parameter in each of the drives described above. For example, it is preferable that a sum of types of drive parameters in each drive, which are combined for use, is equal to or greater than 2 and is equal to or smaller than 6 and that the numerical value that is prepared for every type of drive parameter is equal to or greater than 2 and is equal to or smaller than 6. A plurality of drive patterns DW are configured by combining these, and thus a preferable number of drive patterns DW are obtained.

For example, the drive parameters that are described above with the drive pattern DW that is illustrated in FIG. 9 are the length of the time for performing the alternating current drive, the frequency of the alternating electric current in the alternating current drive, the length of the time for performing the direct current drive, and the polarity of the direct current drive. In this case, the sum of types of drive parameters in each drive is 4.

A plurality of drive patterns DW are different from each other in terms of a value of at least one drive parameter among the plurality of drive parameters described above. The number of drive patterns DW, for example, is equal to or greater than 3, and is equal to or smaller than 150. Preferably, the number of drive patterns DW is equal to or greater than 10, and is equal to or smaller than 100. More preferably, the number of drive patterns DW, for example, is equal to or greater than 20, and is equal to or greater than 30. The number of drive patterns DW is set in this manner, and thus the life of the discharge lamp 90 can be more prolonged.

Next, the switching among the drive patterns DW by the control unit 40 according to the present embodiment will be described. Based on the machine learning, the control unit 40 can switch among the drive patterns DW. The control unit 40 in the present embodiment makes an evaluation of the drive pattern DW based on a change in the lamp voltage Vla, and makes a selection of the drive pattern DW based on the evaluation of the drive pattern DW.

Figure 10:
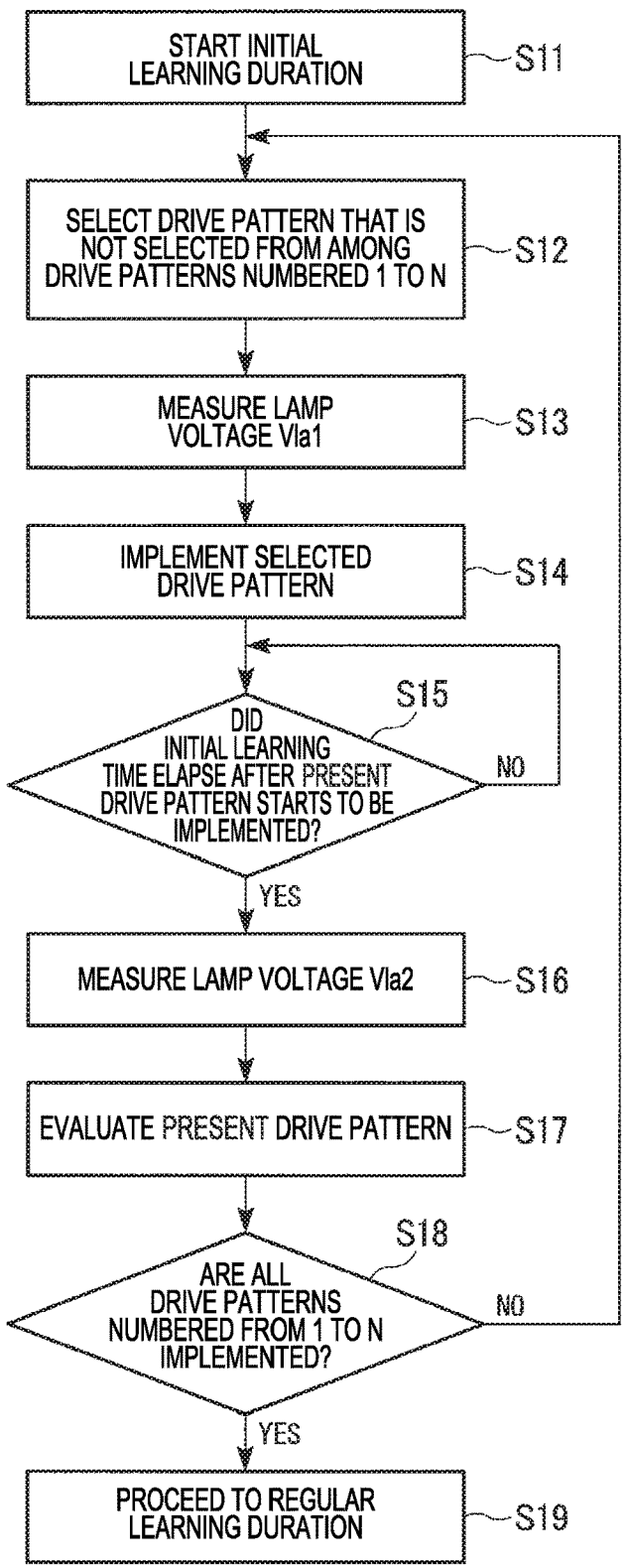
FIG. 10 is a flowchart illustrating an example of a procedure for control by the control unit during an initial learning duration according to the first embodiment.

In the present embodiment, an initial learning duration during which an initial evaluation of a plurality of drive patterns DW is performed, and a regular learning duration that is provided after the initial learning duration are provided. FIG. 10 is a flowchart illustrating an example of a procedure for control by the control unit 40 during the initial learning duration. It is noted that in the following description, N drive patterns DW are provided and the N drive patterns DW are numbered from 1 to N.

As illustrated in FIG. 10, after starting the initial learning duration (Step S11), the control unit 40 selects the drive pattern DW that is not selected during the initial learning duration, from among the drive pattern DW numbered from 1 to N (Step S12). The control unit 40, for example, randomly selects the drive pattern DW that is not selected. Because none of the drive patterns DW is selected immediately after starting the initial learning duration, the control unit 40 selects one drive pattern DW from among the drive patterns DW numbered from 1 to N. Next, the voltage measurement unit of the operation detection unit 60 measures the lamp voltage Vla1 of the discharge lamp 90 (Step S13), and the control unit 40 stores the measured lamp voltage Vla1 in the storage unit 44. Then the control unit 40 implements the selected drive pattern DW (Step S14).

After starting to implement the drive pattern DW, the control unit 40 determines whether or not an initial learning time elapsed after the drive pattern DW that is presently selected starts to be implemented (Step S15). A length of the initial learning time, for example, is equal to or longer than 10 min (minutes), and is equal to or shorter than 120 min (minutes). In a case where the initial learning time did not elapse after the drive pattern DW that is presently selected starts to be implemented (No in Step S15), the control unit 40 continues to implement the drive pattern DW that is presently selected.

On the other hand, in a case where the initial learning time elapsed after the drive pattern DW that is presently selected starts to be implemented (YES in Step S15), the voltage measurement unit of the operation detection unit 60 measures a lamp voltage Vla2 of the discharge lamp 90 (Step S16), and the control unit 40 stores the measured lamp voltage Vla2 in the storage unit 44. Then, the control unit 40 evaluates the drive pattern DW that is presently selected (Step S17).

The evaluation of the drive pattern DW in the present embodiment is made based on the change in the lamp voltage Vla. Specifically, the control unit 40 evaluates the drive pattern DW based on a value of the lamp voltage Vla2 that results after the selected drive pattern DW is implemented for the initial learning time, and on a difference of the lamp voltage Vla2 that results after the drive pattern DW is implemented for the initial learning time, with respect to the lamp voltage Vla1 that is available before the selected drive pattern DW is implemented. In the following description, a difference of the lamp voltage Vla2 that results after the drive pattern DW is implemented for the initial learning time, with respect to the lamp voltage Vla1 that is available before the drive pattern DW is implemented is referred to as a first change voltage value.

At this point, a target numerical value range is set for the lamp voltage Vla. The control unit 40 selects and implements each drive pattern DW in such a manner that the lamp voltage Vla can be maintained in the target numerical value range. The range of the target numerical value, for example, is from 60 V or higher to less than 65 V. Cases where a result of the evaluation of the drive pattern DW is at a relatively high level, for example, include a case where one drive pattern DW is implemented and thus the lamp voltage Vla (the lamp voltage Vla2 that results after one drive pattern DW is implemented for the initial learning time) falls within the target numerical value range, a case where one drive pattern DW is implemented and thus the lamp voltage Vla approaches the target numerical value range, a case where the lamp voltage Vla that is available or results before or after one drive pattern DW is implemented can be maintained to be in the target numerical value range, and the like. Furthermore, a case where the result of the evaluation of the drive pattern DW is at a relatively low level, for example, includes a case where one drive pattern DW is implemented and thus the lamp voltage Vla is outside of the target numerical value range, a case where one drive pattern DW is implemented and thus there is a big difference of the lamp voltage Vla with respect to the target numerical value range, and the like.

As an example, in a case where the lamp voltage Vla2 that results after one drive pattern DW is implemented for the initial learning time is higher than that within the target numerical value range, and where the first change voltage value is a negative value, a result of the evaluation of the selected one drive pattern DW is at a relatively high level. Furthermore, in a case where the lamp voltage Vla2 that results after one drive pattern DW is implemented for the initial learning time is higher than that within the target numerical value range and where the first change voltage value is a positive value, the result of the evaluation of the selected one drive pattern DW is at a relatively low level. On the other hand, in a case where the lamp voltage Vla2 that results after one drive pattern DW is implemented for the initial learning time is lower than that within the target numerical value range and where the first change voltage value is a negative value, the result of the evaluation of the selected one drive pattern DW is at a relatively low level. Furthermore, in a case where the lamp voltage Vla2 that results after one drive pattern DW is implemented for the initial learning time is smaller than that within the target numerical value range and where the first change voltage value is a positive value, the result of the evaluation of the selected one drive pattern DW is at a relatively high level. Moreover, in a case where the lamp voltage Vla2 that results after one drive pattern DW is implemented for the initial learning time is within the target numerical value range, as an absolute value of the first change voltage value is lower, the result of the evaluation of the selected one drive pattern DW is at a relatively higher level. On the other hand, as the absolute value of the first change voltage value is higher, the result of the evaluation of the selected one drive pattern DW is at a relatively lower level.

It is noted that the first change voltage value being a negative value means that one drive pattern DW is implemented for the initial learning time and thus that the lamp voltage Vla drops. The first change voltage value being a positive value means that one drive pattern DW is implemented for the initial learning time and thus that the lamp voltage Vla rises.

After the selected drive pattern DW is evaluated, the control unit 40 determines whether or not the drive patterns DW numbered from 1 to N are all implemented for the initial learning duration (Step S18). In a case where the drive pattern DW that is not implemented during the initial learning duration is present among the drive patterns DW numbered from 1 to N (NO in Step S18), the control unit 40 selects, implements, and evaluates any other drive pattern DW (Steps S12 to S17). On the other hand, in a case where the N drive patterns DW numbers from 1 to N are all implemented during the initial learning duration (YES in Step S18), the control unit 40 ends the initial learning duration and proceeds to the regular learning duration (Step S19). A length of the initial learning duration, for example, is less than 10 h (hours).

In the present embodiment, the drive pattern DW that is not selected from among the plurality of drive patterns DW is selected in Step S12 and then the lamp voltage Vla of the discharge lamp 90 is measured by the voltage measurement unit of the operation detection unit 60, as the lamp voltage Vla1 that is available before the selected drive pattern DW is performed, but no limitation to this is imposed. The lamp voltage Vla1 that is available before the selected X-th drive pattern DW is performed, for example, may be set to be the lamp voltage Vla2 that is measured after a selected (X−1)-th drive pattern DW that immediately precedes the selected X-th drive pattern DW is implemented for the initial learning time. With this control, the measurement of the lamp voltage Vla1 in Step S13 is unnecessary, and the processing for the initial evaluation can be more simplified.

Figure 11:
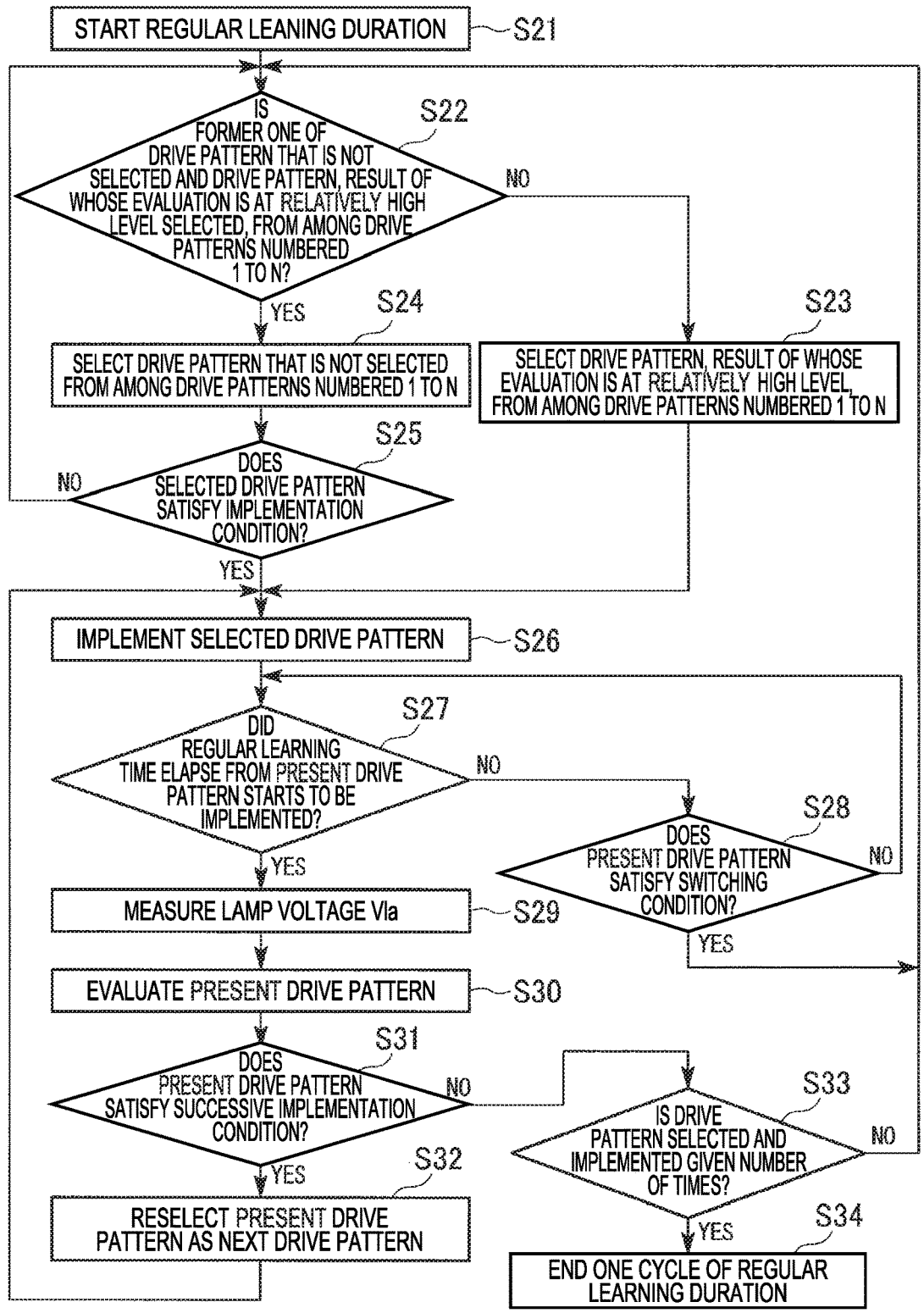
FIG. 11 is a flowchart illustrating an example of a procedure for control by the control unit during a regular learning duration according to the first embodiment.

FIG. 11 is a flowchart illustrating an example of a procedure for control by the control unit 40 during the regular learning duration. In FIG. 11, one cycle during the regular learning duration is illustrated. The control unit 40 in the regular learning duration repeats one cycle as illustrated in FIG. 11. As illustrated in FIG. 11, after starting the regular learning duration (Step S21), the control unit 40 selects one drive pattern DW of the drive pattern DW that is not selected during the regular learning duration and the drive pattern DW, the result of whose evaluation is at a relatively high level, among the drive patterns DW numbered from 1 to N (Steps S22 to S24). It is noted that the control unit 40, for example, randomly selects the drive pattern DW from among the drive patterns DW numbered from 1 to N.

More specifically, for example, the control unit 40 determines whether or not to select the former one (the drive pattern DW that is not selected during the regular learning duration) of the drive pattern DW that is not selected during the regular learning duration and the drive pattern DW, the result of whose evaluation is at a relatively high level, from among the drive patterns DW numbered from 1 to N (Step S22), and, in a case where the drive pattern DW at a relatively high level is selected (NO in Step S22), selects the drive pattern DW, the result of whose evaluation is at a relatively high level, from among the drive patterns DW numbered from 1 to N (Step S23). The control unit 40, for example, selects the drive pattern DW, the result of whose evaluation is at the highest level, that is, the drive pattern DW that causes the lamp voltage Vla to be the closest to the target numerical value range of the lamp voltage Vla, from among the drive patterns DW numbered from 1 to N. Then, the control unit 40 implements the drive pattern DW that is selected in Step S23 (Step S26).

On the other hand, in a case where the former one that is the drive pattern DW which is not selected during the regular learning duration is selected (YES in Step S22), the control unit 40 selects the drive pattern DW that is not selected during the regular learning duration, from among the drive patterns DW numbered from 1 to N (Step S24). Then, in a case where the drive pattern DW that is not selected during the regular learning duration is selected, the control unit 40 determines whether or not the selected drive pattern DW satisfies an implementation condition (Step S25). The implementation condition, for example, includes a condition that, when the selected drive pattern DW is previously selected and is implemented, switching to any other drive pattern DW does not take place in Step S28 that will be described below.

In a case where the drive pattern DW which is selected in Step S24 satisfies the implementation condition (YES in Step S25), proceeding to Step S26 takes place and the control unit 40 implements the selected drive pattern DW. On the other hand, in a case where the selected drive pattern DW does not satisfy the implementation condition (NO in Step S25), proceeding to Step S22 takes place, and the control unit 40 selects any other drive pattern DW from among the drive patterns DW numbered from 1 to N and makes the same determination as described above.

Next, after the selected drive pattern DW starts to be implemented, the control unit 40 determines whether or not the regular learning time elapses after the drive pattern DW that is presently selected starts to be implemented (Step S27). The regular learning time, the elapse of which is determined in Step S27, for example, is the same as the initial learning time, the elapse of which is determined during the initial learning duration in Step S15. That is, a length of the regular learning time, for example, is equal to or longer than 10 min (minutes), and is equal to or shorter than 120 min (minutes). In a case where the regular learning time did not elapse after the drive pattern DW that is presently selected starts to be implemented (NO in Step S27), the control unit 40 determines whether or not the present drive pattern DW satisfies a switching condition (a first given condition) (Step S28).

The switching condition, for example, includes a condition that any one of a first switching condition and a second switching condition is satisfied. The first switching condition is that while the present drive pattern DW is being performed, an absolute value of the change (a change voltage value) in the lamp voltage Vla that is measured within the regular learning time is a first given value or higher and the measured lamp voltage Vla is outside of the target numerical value range. The second switching condition includes a condition that, in a case where the time elapsed after the present drive pattern DW starts to be implemented is a first given time or less, the absolute value of the change in the lamp voltage Vla is a second given value or less. The first time is shorter than the regular learning time, and for example, is 5 min (minutes). The second given value is lower than the first given value. The first given value, for example, is 5 V. The second given value, for example, is 3 V.

That is, when the elapsed time is the first time or less, in a case where the absolute value of the change in the lamp voltage Vla is the second given value or higher, which is lower than the first given value, the switching condition (the second switching condition) is also set to be satisfied. Furthermore, when the first time is exceeded, in a case where the change in the lamp voltage Vla is the first given value or higher, which is higher than the second given value, the switching condition (the first switching condition) is set not to be satisfied. With this relationship, the control unit 40 determines the switching from the drive pattern DW that is presently selected, in a stepwise manner, based on the time for implementing the drive pattern DW that is presently selected and the lamp voltage Vla.

In a case where the drive pattern DW that is presently selected satisfies the switching condition (YES in Step S28), the control unit 40 determines that, in a present state of the discharge lamp 90, the drive pattern DW that is presently selected is the drive pattern DW that is not preferable for prolonging the life of the discharge lamp 90. Then, the control unit 40 sets the result of the evaluation of the drive pattern DW that is presently selected, to be a low level.

Thereafter, in the same manner as described above, the control unit 40 performs Steps S22 to S26, and selects and implements a next drive pattern DW. In this manner, in a case where the change in the lamp voltage Vla satisfies the switching condition when the drive pattern DW is implemented, the control unit 40 switches from the drive pattern DW that is presently selected, to any other drive pattern DW.

On the other hand, in a case where the present drive pattern DW does not satisfy the switching condition (NO in Step S28), the control unit 40 implements the drive pattern DW that is presently selected until the regular learning time has elapsed. Then, in a case where the regular learning time elapsed after the present drive pattern DW starts to be implemented (YES in Step S27), the voltage measurement unit of the operation detection unit 60 measures a lamp voltage Vla of the discharge lamp 90 (Step S29), and the control unit 40 stores the measured lamp voltage Vla in the storage unit 44. Thereafter, the control unit 40 evaluates the drive pattern DW that is presently selected (Step S30).

The evaluation of the drive pattern DW in Step S30, for example, is the same as the evaluation of the drive pattern DW in Step S17 during the initial learning duration. That is, the control unit 40 evaluates the drive pattern DW based on a value of the lamp voltage Vla that results after the selected drive pattern DW is implemented for the regular learning time, and on a difference of the lamp voltage Vla that results after the drive pattern DW is implemented for the regular learning time, with respect to the lamp voltage Vla that is available before the selected drive pattern DW is implemented. In the following description, a difference of the lamp voltage Vla that results after the drive pattern DW is implemented for the regular learning time, with respect to the lamp voltage Vla that is available before the drive pattern DW is implemented is referred to as a second change voltage value.

In Step S30, the control unit 40 makes a revaluation of the drive pattern DW that is selected during the regular learning duration. That is, the control unit 40 updates the evaluation of each drive pattern DW that is made during the initial learning duration, and the evaluation of each drive pattern DW that is made during the regular learning duration that is earlier than a present point in time.

Subsequently, the control unit 40 determines whether or not the drive pattern DW that is presently selected satisfies a successive implementation condition (a second given condition) (Step S31). The successive implementation condition includes a condition that any one of a first successive implementation condition, a second successive implementation condition, and a third successive implementation condition is satisfied. Each of the first successive implementation condition, the second successive implementation condition, and the third successive implementation condition includes a condition that the number of times of successive implementation is a given number of times, or less. Regarding the number of times of successive implementation, the given number of times, for example, is equal to or greater than 2 and is equal to smaller than 15.

Then, the first successive implementation condition is that the lamp voltage Vla which results after the selected drive pattern DW is implemented for the regular learning time is higher than the target numerical value range and that the second change voltage value is a negative value. The second successive implementation condition is that the lamp voltage Vla which is available or results before or after the selected drive pattern DW is implemented is included in the target numerical value range. The third successive implementation condition is that the lamp voltage Vla which results after the selected drive pattern DW is implemented for the regular learning time is lower than the target numerical value range and that the second change voltage value is a positive value.

In a case where the present drive pattern DW satisfies the successive implementation condition (YES in Step S31), the control unit 40 determines that, in the present state of the discharge lamp 90, the drive pattern DW that is presently selected is the drive pattern DW that is not preferable for prolonging the life of the discharge lamp 90. Then, the control unit 40 reselects the drive pattern DW that is presently selected, as the drive pattern DW that will be next implemented (Step S32). Then, proceeding to Step S26 takes place, and the control unit 40 successively implements the drive pattern DW that is previously selected as the drive pattern DW to be lately implemented.

As described above, in a case where the change in the lamp voltage Vla that is available or results before or after the selected one drive pattern DW is implemented for the regular learning time satisfies the successive implementation condition, the control unit 40 in the present embodiment successively implements the same drive patterns DW.

On the other hand, in a case where a presently drive pattern DW does not satisfy the successive implementation condition (NO in Step S31), the control unit 40 determines whether or not the drive patterns DW are selected and implemented a given number of times in Steps S22 to S26 (Step S33).

In a case where the drive patterns DW is not selected and implemented the given number of times (NO in Step S33), proceeding to Step S22 takes place and a reselection of the drive pattern DW is made. The given number of times relating to the selection and implementation of the drive pattern DW during the regular learning duration in one cycle, for example, is greater than the number N of the drive patterns DW.

In a case where the drive patterns DW are selected and implemented a given number of times (YES in Step S33), the control unit 40 ends one cycle of the regular learning duration (Step S34). The control unit 40 repeats one cycle, and thus continues the regular learning duration. The next one cycle is caused to start in a state where each parameter is taken over from the previous cycle of the regular learning duration, in addition to the number of times of the selection and implementation of the drive pattern DW being reset.

As described above, the control unit 40 performs the machine learning during the initial learning duration and the regular learning duration, and selects the drive pattern DW that is to be implemented. The initial learning duration, for example, is set to start one time after the projector 500 is lighted up for the first time. The regular learning duration, for example, is always provided after the initial learning duration is ended and while the projector 500 is lighted up. For example, when the projector 500 is powered off and then powered on, the control unit 40 resumes the duration that was in process when the projector 500 was powered off and restarts from a point at which the interruption occurs.

Figure 12:
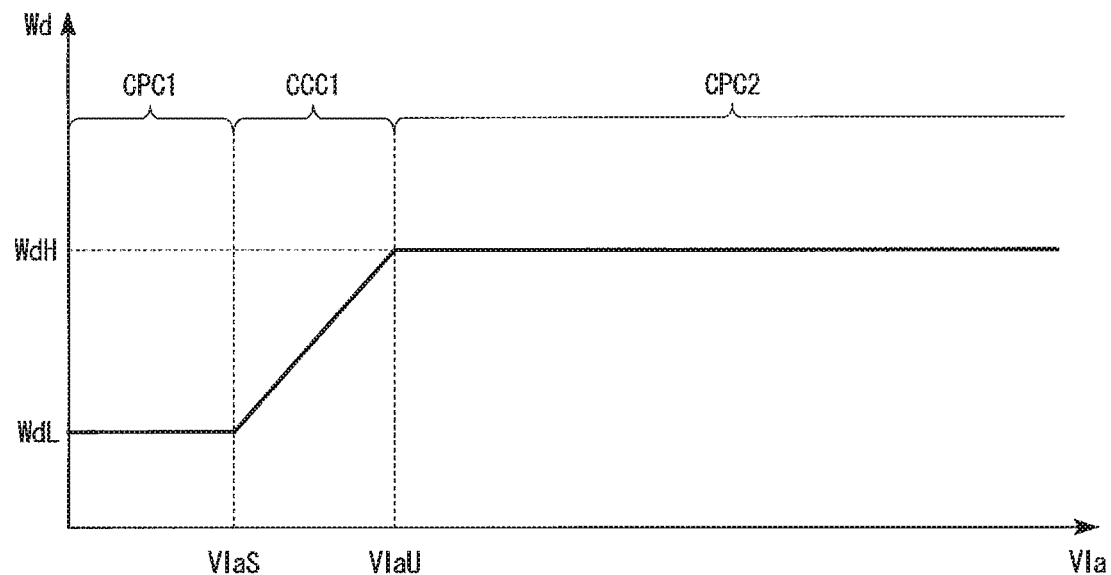
FIG. 12 is a graph representing a change in a drive electric power with respect to a lamp voltage in the first embodiment.

The control unit 40, as described above, changes the drive electric power Wd based on the lamp voltage Vla, while switching the drive patterns DW based on the machine learning. The control unit 40 possibly performs a first constant electric current control (a first control) CCC1, a first constant electric power control (a second control) CPC1, and a second constant electric power control (a third control) CPC2, as controls that cause the drive electric power Wd to be changed. FIG. 12 is a graph representing a change in the drive electric power Wd with respect to the lamp voltage Vla in the present embodiment. In FIG. 12, the vertical axis represents the drive electric power Wd, and the horizontal axis represents the lamp voltage Vla.

The first constant electric current control CCC1, as illustrated in FIG. 12, is a control in which the drive electric power Wd, which is to be supplied to the discharge lamp 90, increases according to an increase in the lamp voltage Vla. In the first constant electric current control CCC1, the control unit 40 supplies the drive electric current I whose electric current value is constant, to the discharge lamp 90. Accordingly, in the first constant electric current control CCC1, the drive electric power Wd changes linearly with respect to the change in the lamp voltage Vla. It is noted that, in the present embodiment, the electric current value of the drive electric current I being constant includes the electric current value being maintained in a given electric current range. The given electric current range, for example, is in a range of electric current values that account for plus and minus 10% of the electric current value which serves as a reference.

The first constant electric power control CPC1 is a control that maintains the drive electric power Wd in a first given electric power range, without depending on the value of the lamp voltage Vla. In the first constant electric power control CPC1, the control unit 40 maintains the drive electric power Wd, which is to be supplied to the discharge lamp 90, at a low electric power value (a given electric power value) WdL. Accordingly, in the first constant electric power control CPC1, a value of the drive electric power Wd is maintained as a constant value (the low electric power value WdL). The low electric power value WdL is lower than a rating electric power value WdH for the discharge lamp 90.

The second constant electric power control CPC2 is a control that maintains the drive electric power Wd in a second given electric power range, without depending on the value of the lamp voltage Vla. In the second constant electric power control CPC2, the control unit 40 maintains the drive electric power Wd, which is to be supplied to the discharge lamp 90, at the rating electric power value WdH. Accordingly, in the second constant electric power control CPC2, the value of the drive electric power Wd is maintained as a constant value (the rating electric power value WdH).

Figure 13:
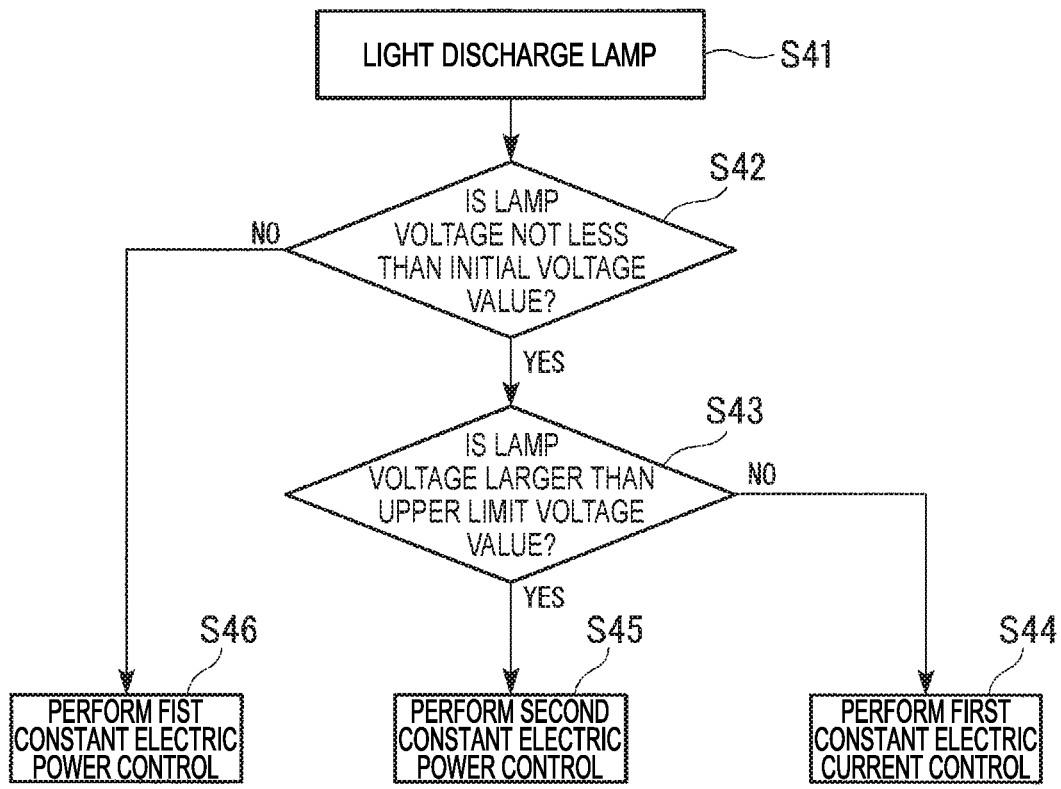
FIG. 13 is a flowchart illustrating an example of a procedure for switching between controls that cause the drive electric power to be changed in the first embodiment.

Next, switching between the controls that cause the drive electric power Wd to be changed in the present embodiment will be described. FIG. 13 is a flowchart illustrating an example of a procedure for the switching between the controls that cause the drive electric power Wd to be changed in the present embodiment.

The control unit 40, as illustrated in FIG. 13, after the discharge lamp 90 is lighted up (Step S41), the control unit 40 determines whether or not the lamp voltage Vla is at or above an initial stage voltage value (a first voltage value) VlaS (Step S42). An initial stage voltage value VlaS is a value of the value of the lamp voltage Vla in an initial stage for the discharge lamp 90. The initial stage voltage value VlaS, for example, is the value of the lamp voltage Vla that results when the lighting-up of the discharge lamp 90 is stabilized after the discharge lamp 90 is lighted up for the first time. When the lighting-up of the discharge lamp 90 is stabilized after the discharge lamp 90 is lighted up for the first time, the control unit 40 measures the value of the lamp voltage Vla using the voltage measurement unit of the operation detection unit 60, and stores the measured value, as the initial stage voltage value VlaS, in the storage unit 44. The initial stage voltage value VlaS, for example, is 65 V or higher and is 70 V or lower.

In a case where the lamp voltage Vla is the initial stage voltage value VlaS or more (YES in Step S42), the control unit 40 determines whether or not the lamp voltage Vla is higher than an upper limit voltage value (a second voltage value) VlaU (Step S43). The upper limit voltage value VlaU in the present embodiment is the value of the lamp voltage Vla in a case where, in the first constant electric current control CCC1, the drive electric power Wd that is to be supplied to the discharge lamp 90 increases up to the rating electric power value WdH. The upper limit voltage value VlaU is higher than the initial stage voltage value VlaS. The upper limit voltage value VlaU, for example, is 75 V or more and is 85 V or less.

In a case where the lamp voltage Vla is at or below the upper limit voltage value VlaU (NO in Step S43), the control unit 40 performs the first constant electric current control CCC1 (Step S44). That is, in a case where the lamp voltage Vla is at or above the initial stage voltage value VlaS and is at or below the upper limit voltage value VlaU, the control unit 40 performs the first constant electric current control CCC1. As described above, the initial stage voltage value VlaS in the present embodiment is the value of the lamp voltage Vla that results when the lighting-up of the discharge lamp 90 is stabilized after the discharge lamp 90 is lighted up for the first time. Therefore, in the present embodiment, when the discharge lamp 90 is lighted up for the first time, first of all, the first constant electric current control CCC1 is performed.

As illustrated in FIG. 12, in the first constant electric current control CCC1 according to the present embodiment, the value of the drive electric power Wd is at the low electric power value WdL in a case where the lamp voltage Vla is at the initial stage voltage value VlaS, and is the rating electric power value WdH in a case where the lamp voltage Vla is at the upper limit voltage value VlaU.

On the other hand, as illustrated in FIG. 13, in a case where the lamp voltage Vla is higher than the upper limit voltage value VlaU (YES in Step S43), the control unit 40 performs the second constant electric power control CPC2 (Step S45). As illustrated in FIG. 12, in the second constant electric power control CPC2, the control unit 40 in the present embodiment constantly maintains the value of the drive electric power Wd as the value (the rating electric power value WdH) of the drive electric power Wd that results when the upper limit voltage value VlaU is reached in the first constant electric current control CCC1. That is, in a case where, in the first constant electric current control CCC1, the lamp voltage Vla is at the upper limit voltage value VlaU, the control unit 40 increases the drive electric power Wd, which is to be supplied to the discharge lamp 90, up to the rating electric power value WdH, and, in the second constant electric power control CPC2, maintains the drive electric power Wd, which is to be supplied to the discharge lamp 90, at the rating electric power value WdH.

Furthermore, AS illustrated in FIG. 13, in a case where the lamp voltage Vla is below the initial stage voltage value VlaS (NO in Step S42), the control unit 40 performs the first constant electric power control CPC1 (Step S46). As illustrated in FIG. 12, in the first constant electric power control CPC1, the control unit 40 in the present embodiment constantly maintains the value of the drive electric power Wd as the value (the low electric power value WdL) of the drive electric power Wd (the rating electric power value WdH) that results when the initial stage voltage value VlaS is reached in the first constant electric current control CCC1. That is, in a case where, in the first constant electric current control CCC1, the lamp voltage Vla is at the initial stage voltage value VlaS, the control unit 40 sets the drive electric power Wd, which is to be supplied to the discharge lamp 90, to be at the low electric power value WdL, and, in the first constant electric power control CPC1, maintains the drive electric power Wd at the low electric power value WdL.

The discharge lamp lighting device 10 that includes the control unit 40 which performs the controls described above can also be expressed as an discharge lamp drive method. That is, according to an aspect of the present embodiment, there is provided a discharge lamp drive method in which drive electric current I is supplied to a discharge lamp 90 that includes a first electrode 92 and a second electrode 93 and thus the discharge lamp 90 is driven, the method including: selecting any one drive pattern DW from among a plurality of drive patterns DW of the drive electric current I, based on machine learning and implementing the selected drive pattern DW; and performing first constant electric current control CCC1 that causes a drive electric power Wd, which is to be supplied to the discharge lamp 90 to increase according to an increase in a lamp voltage Vla, in a case where the lamp voltage Vla of the discharge lamp 90 is at or above an initial stage voltage value VlaS and is at or below an upper limit voltage value VlaU that is higher the initial stage voltage value VlaS.

For example, because the drive pattern DW is set in advance according to the value of the lamp voltage Vla and the value of the drive electric power Wd in the related art, in a case where the lamp voltage Vla and the drive electric power Wd are the same, the drive pattern DW that is to be implemented is one drive pattern DW that is set in advance.

In contrast, in the present embodiment, because the drive pattern DW is selected with the machine learning, for example, in a case where the lamp voltage Vla is at a given voltage value and the drive electric power Wd is at a given electric power value, the plurality of drive patterns DW that are different from each other in terms of at least one drive parameter are implemented. That is, for example, in a case where the drive electric power Wd, which is to be supplied to the discharge lamp 90, is in a given electric power band and where the lamp voltage Vla of the discharge lamp 90 is at a given voltage value, the control unit 40 implements at least three drive patterns DW. The at least three drive patterns DW are drive patterns DW that are different from each other in terms of a value of at least one drive parameter, among a plurality of drive parameters in a drive that constitutes one drive pattern DW. That is, in a case where the lamp voltage Vla is set to be constant and where the drive pattern DW of the drive electric current I that is to be supplied to the discharge lamp 90 is detected, with an electric power band of the drive electric power Wd being set to be constant, it is possible that at least three or more different drive patterns DW are detected. It is noted that the given electric power band, for example, is a range of numerical values of the drive electric power Wd that is approximately 10 W in width.

Furthermore, as described above, when the drive pattern DW is selected and implemented with machine learning, in a case where the lamp voltage Vla of the discharge lamp 90 is at a given voltage value, there is a difference in an accumulated lighting time TT for the discharge lamp 90 or an individual that is the discharge lamp 90 and thus there is a difference in the drive pattern DW that is selected and implemented. That is, in a case where the lamp voltage Vla of the discharge lamp 90 is at a given voltage value, the control unit 40 implements at least two drive patterns DW, for example, a first drive pattern and a second drive pattern, according to at least one of the accumulated lighting time TT for the discharge lamp 90 and an individual that is the discharge lamp 90.

The first drive pattern and the second drive pattern are any two drive patterns DW among a plurality of drive patterns DW. The first drive pattern and the second drive pattern are different from each other in terms of a value of at least one drive parameter among a plurality of drive parameters in the drive that constitutes each drive pattern. It is noted that the accumulated lighting time TT is a total of times for which the discharge lamp 90 is lighted up. That is, the accumulated lighting time TT is a time that results from accumulating the times for which the discharge lamp 90 has been lighted up since the discharge lamp 90 was lighted up for the first time.

Specifically, for example, in a case where the lamp voltage Vla is at a given voltage value and where the accumulated lighting time TT is a first accumulated lighting time, the control unit 40 implements the first drive pattern. Furthermore, in a case where the lamp voltage Vla is at the given voltage value and where the accumulated lighting time TT is a second accumulated lighting time, which is different from the first accumulated lighting time, the control unit 40 implements the second drive pattern. That is, in a case where the drive pattern DW of the drive electric current I, which is to be supplied to the discharge lamp 90, is detected with the lamp voltage Vla being constant, when the accumulated lighting time TT for the discharge lamp 90 changes, it is possible that at least two or more drive patterns DW are detected.

Furthermore, for example, in a case where the lamp voltage Vla is at a given voltage value and where the discharge lamp 90 is a first individual, the control unit 40 performs the first drive pattern. Furthermore, in a case where the lamp voltage Vla is at the given voltage value and where the discharge lamp 90 is a second individual, which is different from the first individual, the control unit 40 performs the second drive pattern. That is, in the case where the drive pattern DW of the drive electric current I, which is to be supplied to the discharge lamp 90, is detected with the lamp voltage Vla being constant, when an individual that is the discharge lamp 90 changes, it is possible that at least two or more drive patterns DW are detected.

It is noted that the case where there is a difference in a value of at least one drive parameter among a plurality of drive parameters includes a case where there is a difference between two drive patterns DW in terms of the drive that constitute each drive pattern DW. More specifically, for example, the first drive pattern and the second drive pattern are also set to be drive patterns DW that are different from each other in terms of a value of at least one drive pattern, in a case where the first drive pattern is configured with the alternating current drive and the second drive pattern is configured with the direct current drive and alternating current drive, and where each drive parameter relating to the alternating current drive in the first drive pattern and each drive parameter relating to the alternating current drive in the second drive pattern are the same. In this case, because the direct current drive is not included in the first drive pattern, the drive parameter relating to the direct current drive in the first drive pattern is zero. Accordingly, the first drive pattern and the second drive pattern in this case are different from each other in terms of the drive parameter relating to the direct current drive.

According to the present embodiment, as described above, the control unit 40 selects any one drive pattern DW from among a plurality of drive patterns DW, based on the machine learning, and implements the selected drive pattern DW. For this reason, even in a case where there is an individual difference of the discharge lamp 90, a suitable drive pattern DW can be selected according to the individual difference of the discharge lamp 90 by performing the machine learning. Therefore, according to the present embodiment, the life of the discharge lamp 90 can be prolonged without depending on the individual difference of the discharge lamp 90.

Furthermore, when the drive electric power Wd that is to be supplied to the discharge lamp 90 changes, the degree of melting of, and the degree of growth, of the protrusion 552p of the first electrode 92 change. For this reason, in the related art, there is a need to determine the drive pattern DW suitable for the drive electric current I that is to be supplied to the discharge lamp 90, according to the lamp voltage Vla, for each drive electric power Wd that is to be supplied to the discharge lamp 90, and to store the determined drive pattern DW in the storage unit 44. Therefore, there is provided a specification in which the drive pattern DW is difficult to set according to the lamp voltage Vla for each of all the drive electric powers Wd and in which the drive electric power Wd that is to be supplied to the discharge lamp 90 cannot be changed except for a plurality of drive electric powers Wd that are determined set in advance.

In contrast, according to the present embodiment, because the drive pattern DW is selected based on the machine learning, even in a case where the drive electric power Wd is changed, a suitable drive pattern DW can be selected according to the change in the drive electric power Wd. Accordingly, it is possible that the drive electric power Wd, which is to be supplied to the discharge lamp 90, is easily changed in a stepwise manner. Therefore, for example, it is possible that a user voluntarily changes the drive electric power Wd and thus freely changes the luminance of an image that is projected from the projector 500. For this reason, for example, it is also possible that the drive electric power Wd is decreased to a relatively low level and thus the life of the discharge lamp 90 is prolonged while power consumption by the projector 500 is suppressed. Furthermore, as in the first constant electric current control CCC1 described above, even in a case where control is performed that changes the drive electric power Wd in such a manner that the drive electric current I is constant according to a change in the lamp voltage Vla, the life of the discharge lamp 90 can be suppressed from being decreased.

Furthermore, because it is possible that the drive electric power Wd is voluntarily changed, it is also possible that the drive electric power Wd is used as one drive parameter of the drive pattern DW that is changed when prolonging the life of the discharge lamp 90. Accordingly, the life of the discharge lamp 90 can be more prolonged. For example, an operation unit for changing the drive electric power Wd may be provided on the casing of the projector 500.

Furthermore, according to the present embodiment, the control unit 40 makes a selection of the drive pattern DW based on the change in the lamp voltage Vla. For this reason, the lamp voltage Vla is measured, and thus the selection of the drive pattern DW can be made and the machine learning can be performed suitably and easily.

Furthermore, according to the present embodiment, in a case where the change in the lamp voltage Vla that is measured satisfies the switching condition when the selected drive pattern DW is implemented, the control unit 40 performs the switching from the selected drive pattern DW to any other drive pattern DW. For this reason, in a case where the selected drive pattern DW is the drive pattern DW that is not preferable for prolonging the life of the discharge lamp 90 in comparison with the state thereof, the switching from the drive pattern DW to any other suitable drive pattern DW may take place. Therefore, the life of the discharge lamp 90 can be suppressed from being decreased.

Furthermore, as described above, the result of the evaluation of the drive pattern DW that satisfies the switching condition is set to be a low level, and the drive pattern DW that satisfies the switching condition in the second place is selected in Step S24. When it is determined in Step S25 whether or not the drive pattern DW that satisfies the switching condition satisfies the implementation condition, it is determined that the implementation condition is not satisfied. That is, the control unit 40 does not implement the drive pattern DW that satisfies the switching condition during a given duration. For this reason, according to the present embodiment, the drive pattern DW that has a high likelihood of decreasing the life of the discharge lamp 90 can be suppressed from being implemented, and the life of the discharge lamp 90 can be more prolonged.

As described above, in a case where the regular learning time elapsed from the selected drive pattern DW starts to be implemented, the control unit 40 selects the next drive pattern DW. Because of this, a length of the time for implementing the drive pattern DW is basically the same as the length of the regular learning time. However, in some cases, due to the state of the discharge lamp 90, the switching from the drive pattern DW that is selected during the regular learning duration to any other drive pattern DW is performed on the way before the regular learning time elapsed. Because of this, even in the case of the same drive pattern DW, in some cases, the time for implementing the selected one drive pattern DW changes from when one drive pattern DW starts to be implemented to when the switching to the next drive pattern DW takes pace.

That is, based on the lamp voltage Vla, the control unit 40 changes a length of the time for implementing a given drive pattern DW, among a plurality of drive patterns DW. For this reason, according to the change in the lamp voltage Vla, the switching to a suitable drive pattern DW can take place, and thus the life of the discharge lamp 90 can be more prolonged.

Furthermore, the length of the time for implementing the given drive pattern DW, among the plurality of drive patterns DW, changes as described above, and because of this, changes according to the accumulated lighting time TT for the discharge lamp 90. Furthermore, the length of the time for implementing the given drive pattern DW, among the plurality of drive patterns DW, changes as described above, and because of this, changes according to an individual that is the discharge lamp 90. In a case where the switching from the selected drive pattern DW to any other drive pattern DW is performed on the way, the time for implementing the selected drive pattern DW is shorter than the regular learning time.

Furthermore, for example, even in the case of the drive pattern DW that has the highest level of the result of the evaluation, that is, the drive pattern DW that causes the lamp voltage Vla of the discharge lamp 90 to be the closest to the target numerical value range, if the same drive pattern DW is always implemented, in some cases, it is difficult for the protrusion 552p of the first electrode 92 to grow, and in other cases, the life of the discharge lamp 90 is difficult to sufficiently prolong. Furthermore, for example, the degree of the melting of the protrusion 552p of the first electrode 92 of the discharge lamp 90 changes with a degradation in the discharge lamp 90, that is, an increase in the accumulated lighting time TT. For this reason, in some cases, a drive pattern DW, although suitable for prolonging the life of the discharge lamp 90 at a certain point in time, is not suitable for prolonging the life of the discharge lamp 90 at any other point in time.

In contrast, according to the present embodiment, in one cycle of the regular learning duration, the control unit 40 selects and implements the higher one of the drive pattern DW that is not selected from among N drive patterns DW and the drive patterns DW that have a relatively high level of the result of the evaluation. For this reason, in one cycle, both each of the drive patterns DW that have a relatively high level of the result of the evaluation, which include the drive pattern DW that has the highest level of the result of the evaluation, and any other drive pattern DW are simultaneously implemented. That is, during a constant duration, the control unit 40 according to the present embodiment implements both each of the drive patterns DW (hereinafter referred to as a high-level evaluation-result drive pattern DWm) that have a relatively high level of the result of the evaluation, which include the drive pattern DW that has the highest level of the result of the evaluation, among a plurality of drive patterns DW, and the drive pattern DW (hereinafter referred to as any other drive pattern DWe) that has a lower level of the result of the evaluation than the high-level evaluation-result drive pattern DWm, among the plurality of drive patterns DW. Accordingly, any other drive pattern DWe that has a lower level of the result of the evaluation than the high-level evaluation-result drive pattern DWm, among the high-level evaluation-result drive patterns DWm that have a high level of the result of the evaluation, can be implemented, and stimulus, such as thermal load that is applied to the first electrode 92, is easy to greatly change. Therefore, the protrusion 552p is easily caused to grow, and the life of the discharge lamp 90 is easy to prolong.

Furthermore, according to the present embodiment, in a case where the change in the lamp voltage Vla that is available or results before or after the selected one drive pattern DW is implemented satisfies the successive implementation condition, the control unit 40 successively implements the selected drive pattern DW a plurality of times. At this point, according to the present embodiment, in the case where the lamp voltage Vla is at a given voltage value and the drive electric power Wd is at a given electric power value, a configuration is employed in which the plurality of drive patterns DW that are different from each other in terms of at least one drive parameter are implemented. That is, according to the present embodiment, a randomness property in which one drive pattern is selected under one condition from among two or more drive patterns DW is provided, and on the other hand, a property in which, in a case where the selected drive pattern DW satisfies the successive implementation condition, one same drive pattern is successively implemented is also provided. For this reason, the drive pattern DW suitable for prolonging the life of the discharge lamp 90 can be successively implemented a plurality of times and the life of the discharge lamp 90 is easy to prolong more. Furthermore, the successive implementation condition in the present embodiment includes a condition that the number of times of successive implementation is a given number of times or less. For this reason, for the implementation time for which the drive pattern DW is implemented by the degree to which the state of the discharge lamp 90 is not greatly changed, a suitable drive pattern DW can be successively implemented a plurality of times. Therefore, the life of the discharge lamp 90 is easy to prolong more.

Furthermore, according to the present embodiment, the control unit 40 determines whether or not the implementation condition is satisfied as illustrated in Step S25, and, in a case where the implementation condition is not satisfied, does not implement the drive pattern DW. Accordingly, the drive pattern DW that has a relatively low level of the result of the evaluation is difficult to implement. Therefore, the life of the discharge lamp 90 is easy to prolong more.

Because the drive pattern DW is selected and implemented based on the machine learning as described above, in the present embodiment, the probabilities that the drive pattern DW will be implemented are different from each other without depending on the lamp voltage Vla. That is, in a case where the lamp voltage Vla of the discharge lamp 90 is at a given value, a probability that the first drive pattern will be implemented and a probability that the second drive pattern will be implemented are different from each other.

Furthermore, during an implementation duration during which each of at least the first drive pattern and the second drive pattern is implemented one or more times, a ratio of the implementation time for implementing the first drive pattern to a length of the implementation duration, and a ratio of the implementation time for implementing the second drive pattern to the length of the implementation duration are different from each other. The implementation duration, for example, is equivalent to one cycle of the regular learning duration.

During the implementation duration during which each of at least the first drive pattern and the second drive pattern is implemented, that is, for example, in one cycle of the regular learning duration, the number of times that the first drive pattern is implemented and the number of times that the second drive pattern is implemented are different from each other. In a case where the first drive pattern is set to be each of the high-level evaluation-result drive patterns DWm that include the drive pattern DW which has the highest level of the result of the evaluation, and where the second drive pattern is set to be one drive pattern DW among any other drive patterns DWe, the number of times that the first drive pattern is implemented is greater than the number of times that the second drive pattern is implemented.

Furthermore, for example, when the number N of the plurality of selected drive patterns DW is too small, in some cases, a suitable drive pattern DW in accordance with the state of the discharge lamp 90 is not included. On the other hand, when the number of drive patterns DW is too great, the initial learning duration is lengthened, and it takes time to select the suitable drive pattern DW. Furthermore, during the regular learning duration, a ratio in which the drive pattern DW other than the suitable drive pattern DW is implemented increases.

In contrast, if the number of drive patterns DW is equal to or greater than 10 and is equal to or smaller than 100, the suitable drive pattern DW in accordance with the state of the discharge lamp 90 is easy to select, and the length of the initial learning duration can also be shortened. Furthermore, during the regular learning duration, because a ratio of the suitable drive patterns DW can be increased, the life of the discharge lamp 90 can be more prolonged. Furthermore, if the number of drive patterns DW is equal to or greater than 20, and is equal to smaller than 30, more effects of this type can be achieved.

Figure 14:
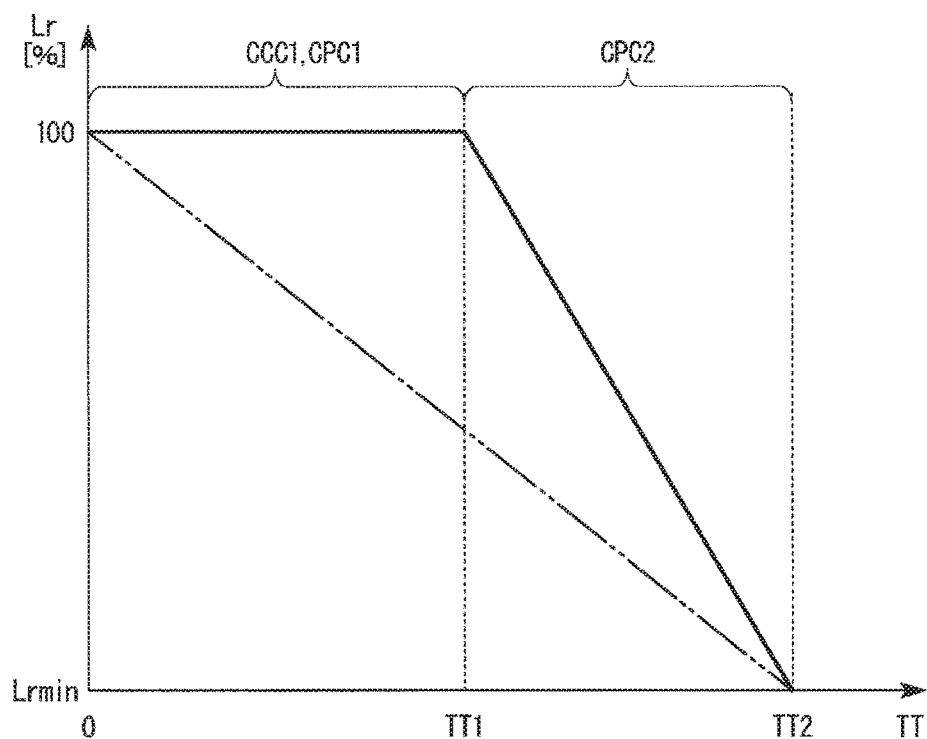
FIG. 14 is a graph representing a relationship between an accumulated lighting time and an illumination level maintenance ratio in the first embodiment.

FIG. 14 is a graph representing a relationship between the accumulated lighting time TT and an illumination level maintenance ratio Lr in the present embodiment. In FIG. 14, the vertical axis represents the illumination level maintenance ratio Lr [%], and the horizontal axis represents the accumulated lighting time TT. The illumination level maintenance ratio Lr is a ratio of a present illumination level of the discharge lamp 90 to an illumination level of the discharge lamp 90, which results when the discharge lamp 90 is lighted up for the first time. A solid line that is illustrated in FIG. 14 indicates a change in the illumination level maintenance ratio Lr in a case where the switching to each control that changes the drive electric power Wd in the present embodiment is performed. A two-dot chain line that is illustrated in FIG. 14 indicates the change in the illumination level maintenance ratio Lr in a case where the drive electric power Wd continues to be constantly maintained at the low electric power value WdL, without changing the drive electric power Wd.

For example, in the case of the control that maintains the drive electric power Wd as constant, as indicated by the two-dot chain line in FIG. 14, as the accumulated lighting time TT for the discharge lamp 90 increases, the illumination level maintenance ratio Lr decreases. The reason for this is as follows. When the accumulated lighting time TT increases, the lamp voltage Vla increases. For this reason, in a case where the drive electric power Wd is constant, an amount of drive electric current I that is to be supplied to the discharge lamp 90 decreases. Accordingly, a plasma dentistry due to the arc discharge decreases, and the illumination level of the discharge lamp 90 is lowered. Therefore, as the accumulated lighting time TT increases, the illumination level maintenance ratio Lr decreases.

In an example in FIG. 14, when the accumulated lighting time TT is at a value TT2, the illumination level maintenance ratio Lr is at a limit value Lrmin. The limit value Lrmin is a value of the illumination level maintenance ratio Lr, at which the ability to withstand the use of the discharge lamp 90 is limited. The limit value Lrmin, for example, is 50%. The life of the discharge lamp 90 is equivalent to the accumulated lighting time TT that the illumination level maintenance ratio Lr takes to reach the limit value Lrmin. That is, the value TT2 is equivalent to the life of the discharge lamp 90.

As described above, in the control that maintains the drive electric power Wd as constant, the more frequently the discharge lamp 90 is lighted up, the more the illumination level maintenance ratio Lr for the initial stage for the discharge lamp 90 is decreased. Because of this, a duration during which an initial illumination level maintenance ratio Lr for the discharge lamp 90 is maintained is easily shortened, and a duration for use in a state where the illumination level maintenance ratio Lr for the discharge lamp 90 is relatively low is easily lengthened. Furthermore, a user who uses the discharge lamp 90 is made to recognize that, as the discharge lamp 90 continues to be used, the illumination level (the brightness) of the discharge lamp 90 decreases. For this reason, in some cases, the comfortableness for the user cannot be sufficiently improved. Specifically, in a case where, as in the present embodiment, the discharge lamp 90 is mounted in the projector 500, the duration for use in a state where the luminance of the image that is projected from the projector 500 is relatively low is easily lengthened. It is noted that as indicated by a two-dot chain line in FIG. 14, the illumination level maintenance ratio Lr, for example, changes linearly with respect to the accumulated lighting time TT.

In contrast, according to the present embodiment, in a case where the lamp voltage Vla is at or above the initial stage voltage value VlaS and is at or below the upper limit voltage value VlaU, the first constant electric current control CCC1 is performed. In the first constant electric current control CCC1, the drive electric power Wd that is to be supplied to the discharge lamp 90 increases according to the increase in the lamp voltage Vla. For this reason, in a case where the lamp voltage Vla increases, the drive electric power Wd can be increased and thus the amount of the drive electric current I that is to be supplied to the discharge lamp 90 can be increased. Accordingly, while the first constant electric current control CCC1 is performed, although the accumulated lighting time TT increases, the illumination level maintenance ratio Lr for the discharge lamp 90 can be suppressed from decreasing. That is, while the first constant electric current control CCC1 is performed, the illumination level (the brightness) of the discharge lamp 90 can be maintained as constant. Therefore, the constant brightness can be provided to a user of the discharge lamp 90 since the initial use of the discharge lamp 90. Moreover, the duration for use in a state where the illumination level maintenance ratio Lr of the discharge lamp 90 is relatively high can be easily extended, and the comfortableness for the user can be improved.

Furthermore, in a case where the drive electric power Wd is maintained as constant, when the lamp voltage Vla increases, the amount of the drive electric current I that is to be supplied to the discharge lamp 90 decreases. Because of this, in some cases, the thermal load that is applied to the first electrode 92 and the second electrode 93 decreases and it is difficult for the protrusions 552p and 562p to grow. In contrast, according to the present embodiment, even in a case where, with the first constant electric current control CCC1, the lamp voltage Vla changes, a value of the drive electric current I can be maintained. Because of this, the thermal load that is applied to the first electrode 92 and the second electrode 93 can be suppressed from decreasing. Therefore, sufficient thermal load is easy to apply to the first electrode 92 and the second electrode 93, and the protrusions 552p and 562p are easily caused to grow. As a result, the life of the discharge lamp 90 can be prolonged. As described above, although the drive electric power Wd is changed in this manner based on the change in the lamp voltage Vla, the life of the discharge lamp 90 can be suppressed from decreasing, by using the machine learning.

Furthermore, according to the present embodiment, in the first constant electric current control CCC1, the drive electric current I whose electric current value is constant is supplied to the discharge lamp 90. For this reason, during a duration during which the first constant electric current control CCC1 is performed, the illumination level maintenance ratio Lr for the discharge lamp 90 is easy to maintain as constant. Accordingly, although the accumulated lighting time TT increases, the illumination level maintenance ratio Lr for the discharge lamp 90 can be more suppressed from decreasing, and the comfortableness for the user can be more improved. In the present embodiment, in a case where the lamp voltage Vla is at or above the initial stage voltage value VlaS, the first constant electric current control CCC1 is performed. Because of this, the first constant electric current control CCC1 is performed after the discharge lamp 90 is used for the first time. Accordingly, during a duration during which the first constant electric current control CCC1 is performed, the illumination level maintenance ratio Lr for the discharge lamp 90 is maintained as being almost 100%.

Furthermore, for example, after the discharge lamp 90 is lighted up for the first time, in some cases, the protrusions 552p and 562p of the first electrode 92 and the second electrode 93 grow and the lamp voltage Vla is lower than the initial stage voltage value VlaS. In some cases, this phenomenon occurs particularly in a case where the accumulated lighting time TT for the discharge lamp 90 ranges from several tens of hours to several hundreds of hours. When the first constant electric current control CCC1 is performed in this case, the value of the drive electric power Wd is lower than the low electric power value WdL, and a temperature within the discharge space 91 in the discharge lamp 90 is relatively low. Accordingly, in some cases, a pressure of gas that is a discharge medium decreases, and the illumination level of the discharge lamp 90 is lowered.

In contrast, according to the present embodiment, in a case where the lamp voltage Vla is lower than the initial stage voltage value VlaS, the first constant electric power control CPC1 is performed that maintains the drive electric power Wd in the first given electric power range, without depending on the value of the lamp voltage Vla. That is, in the first constant electric power control CPC1, in a case where, with the first constant electric current control CCC1, the lamp voltage Vla is the initial stage voltage value VlaS, the drive electric current I that is at a higher electric current value than the drive electric current I that is to be supplied to the discharge lamp 90 is supplied to the discharge lamp 90. For this reason, in a case where the lamp voltage Vla is below the initial stage voltage value VlaS, the drive electric power Wd can be suppressed from decreasing and the temperature within the discharge space 91 can be suppressed from being lowered. Accordingly, the illumination level of the discharge lamp 90 can be suppressed from being lowered. Furthermore, on the other hand, in a case where the lamp voltage Vla is below the initial stage voltage value VlaS, although the drive electric power Wd is maintained in a constant range, it is difficult for the lowering of the illumination level to take place. Therefore, according to the present embodiment, the illumination level maintenance ratio Lr for the discharge lamp 90 can be more suppressed from being lowered, and the comfortableness for the user can be more improved.

Furthermore, according to the present embodiment, the drive electric power Wd that is to be supplied to the discharge lamp 90 in the first constant electric power control CPC1 is maintained at the low electric power value WdL at which the drive electric power Wd is in a case where the lamp voltage Vla is at the initial stage voltage value VlaS in the first constant electric current control CCC1. For this reason, in a case where the lamp voltage Vla is at a value in the vicinity of the initial stage voltage value VlaS, the illumination level of the discharge lamp 90 in the first constant electric power control CPC1 is approximately the same as the illumination level of the discharge lamp 90 in the first constant electric current control CCC1. At this point, in a case where the lamp voltage Vla is below the initial stage voltage value VlaS, the value of the lamp voltage Vla easily reaches the vicinity of the initial stage voltage value VlaS. For this reason, switching between the first constant electric current control CCC1 and the first constant electric power control CPC1 is performed, and thus while the first constant electric current control CCC1 and the first constant electric power control CPC1 are performed, the illumination level of the discharge lamp 90 is maintained as approximately constant, and the comfortableness for the user can be suppressed from decreasing. That is, the switching between the first constant electric current control CCC1 and the first constant electric power control CPC1 is performed, and thus while the first constant electric current control CCC1 or the first constant electric power control CPC1 is performed, the illumination level of the discharge lamp 90 can be maintained as approximately constant.

It is noted that in the present specification, the expression "An illumination level of a discharge lamp is approximately constant during a certain duration", for example, includes the meaning that during a certain duration, a ratio of a maximum value of an illumination level of a discharge lamp to a minimum value of the illumination level of the discharge lamp is equal to or greater than 1.0 and is equal to or smaller than 1.2.

Furthermore, according to the present embodiment, in a case where the lamp voltage Vla is at or above the initial stage voltage value VlaS that is the value of the lamp voltage Vla in the initial stage for the discharge lamp 90, the first constant electric current control CCC1 is performed. For this reason, the illumination level of the discharge lamp 90 can be maintained as constant, from the initial stage where the discharge lamp 90 starts to be used, and the comfortableness for the user can be more improved.

Furthermore, in the first constant electric current control CCC1, the more the lamp voltage Vla increases, the more the drive electric power Wd increases. Because of this, when the lamp voltage Vla increases to some degree, the drive electric power Wd, which is to be supplied to the discharge lamp 90, excessively increases. In this case, in some cases, a heavy load is applied to the discharge lamp 90, and the life of the discharge lamp 90 is decreased.

In contrast, according to the present embodiment, in a case where the lamp voltage Vla is at or above the upper limit voltage value VlaU, the second constant electric power control CPC2 is performed that maintains the drive electric power Wd in the second given electric power range, without depending on the value of the lamp voltage Vla. For this reason, the drive electric power Wd that is to be supplied to the discharge lamp 90 can be suppressed from excessively increasing, and the life of the discharge lamp 90 can be suppressed from being decreased.

In the example in FIG. 14, when the accumulated lighting time TT exceeds a value TT1, the switching from the first constant electric current control CCC1 to the second constant electric power control CPC2 is performed. That is, when the accumulated lighting time TT is at the value TT1, the lamp voltage Vla is at the upper limit voltage value VlaU. In the second constant electric power control CPC2, as the accumulated lighting time TT increases, the illumination level maintenance ratio Lr decreases. Then, for example, as indicated by the two-dot chain line, in the same manner as in the control that maintains the drive electric power Wd as constant, when the accumulated lighting time TT is at the value TT2, the illumination level maintenance ratio Lr is at the limit value Lrmin. The illumination level maintenance ratio Lr is high, compared with a case where the drive electric power Wd that is indicated by the two-dot chain line is maintained as constant, while the accumulated lighting time TT changes from the value TT2 to the value TT1. Therefore, even in a case where the second constant electric power control CPC2 is performed, the illumination level of the discharge lamp 90 can be raised and the comfortableness for the user can be improved, compared with a case where the drive electric power Wd continues to be maintained as constant.

Furthermore, according to the present embodiment, the lamp voltage Vla is easy to maintain at a suitable value, using the machine learning. Because of this, the value TT1 is sufficiently high that corresponds to the accumulated lighting time TT that the lamp voltage Vla takes to reach the upper limit voltage value VlaU. Therefore, a duration during which the illumination level maintenance ratio Lr is maintained as being almost 100% can be extended, and the comfortableness for the user can be more improved.

Furthermore, according to the present embodiment, the drive electric power Wd that is to be supplied to the discharge lamp 90 in the second constant electric power control CPC2 is maintained at the rating electric power value WdH at which the drive electric power Wd is in a case where the lamp voltage Vla is at the upper limit voltage value VlaU in the first constant electric current control CCC1. For this reason, in a case where the lamp voltage Vla is at a value in the vicinity of the upper limit voltage value VlaU, the illumination level of the discharge lamp 90 in the second constant electric power control CPC2 is approximately the same as the illumination level of the discharge lamp 90 in the first constant electric current control CCC1. Accordingly, when the switching from the first constant electric current control CCC1 to the second constant electric power control CPC2 is performed, the illumination level of the discharge lamp 90 can be suppressed from changing abruptly and the comfortableness for the user can be suppressed from decreasing. Furthermore, because the drive electric power Wd that is maintained is at the rating electric power value WdH, the value of the drive electric power Wd that is to be applied to the discharge lamp 90 can be suitably maintained, and the life of the discharge lamp 90 can be suppressed from being decreased.

It is noted that, in the present embodiment, the following configurations and methods can be employed.

As long as the control unit 40 selects and implements the drive pattern DW based on the machine learning, a machine learning method is not particularly limited. A method of evaluating the drive pattern DW described above is not particularly limited. The initial learning time and the regular learning time may be different from each other.

Furthermore, in a case where the lamp voltage Vla drops to a third given value or higher, the control unit 40 may perform the switching from the drive pattern DW to the drive pattern DW that is previously implemented. More specifically, for example, when the selected one drive pattern DW is implemented, the control unit 40 determines whether or not the lamp voltage Vla drops to the third given value or higher, based on the lamp voltage Vla that is measured within the regular learning time, and, in a case where the lamp voltage Vla drops to the third given value or higher, performs the switching to the drive pattern DW that is previously implemented. With this configuration, for example, in a case where the protrusion 552$p$ moves and the lamp voltage Vla drops abruptly, the switching to the drive pattern DW that is available before the protrusion 552$p$ moves can be performed. Accordingly, a change from a position of the protrusion 552$p$ to a pre-movement position is easily made. Furthermore, in the case where the lamp voltage Vla drops to the third given value or higher, the control unit 40 may perform the switching from the drive pattern DW to the drive pattern DW that is different from the drive pattern DW which is previously implemented.

Furthermore, based on the lamp voltage Vla, the control unit 40 may change the length of the regular learning time. For example, when the discharge lamp 90 is degraded, in some cases, the time that the change in the lamp voltage Vla due to the drive pattern DW to take place is lengthened. In this case, when the time for implementing the drive pattern DW is short, in some cases, the drive pattern DW can be suitably evaluated. In contrast, the length of the regular learning time is changed based on the lamp voltage Vla, and thus the regular learning time can be lengthened in a case where the discharge lamp 90 is degraded and the time for implementing the drive pattern DW can be lengthened. Therefore, the drive pattern DW is easy to evaluate suitably, and as a result, the life of the discharge lamp 90 can be prolonged.

Furthermore, based on the lamp voltage Vla, the control unit 40 may change the number of drive patterns DW and may change a type of drive parameter in each drive that constitutes the drive pattern DW. In these cases, based on the lamp voltage Vla, the control unit 40 may change the number of types of drive parameters that are different from each other among a plurality of drive patterns DW. For example, in a case where the lamp voltage Vla is higher than a first voltage, the control unit 40 may increase the number of types of drive parameters that are different from each other among the plurality of drive patterns DW. With this configuration, in a case where the discharge lamp 90 is degraded, an increase in stimulus due to a change in the thermal load that is applied to the first electrode 92 can be easily caused, and the life of the discharge lamp 90 can be more prolonged.

Furthermore, based on the change in the immediately-preceding lamp voltage Vla, the control unit 40 may select the drive pattern DW. Furthermore, the control unit 40 may implement all drive patterns DW necessarily one time for each drive pattern DW in one cycle of the regular learning duration. Furthermore, the control unit 40 may create a drive pattern DW other than a plurality of drive patterns DW that are set in advance during the regular learning duration. In this case, based on an evaluation value of each drive pattern DW that is set in advance, the control unit 40 may create a new drive pattern DW by combining drive parameters.

Furthermore, in Step S15 during the initial learning duration, as in Step S28 during the regular learning duration, the control unit 40 may determine whether or not the drive pattern DW that is presently selected satisfies the switching condition. For example, in a case where the drive pattern DW that is presently selected satisfies the switching condition, the control unit 40 may set the result of the evaluation of the drive pattern DW that is presently selected, to be at a low level, and may perform the switching from the drive pattern DW that is presently selected to any other drive pattern DW. On the other hand, in a case where the drive pattern DW that is presently selected does not satisfy the switching condition, the control unit 40 may implement the drive pattern DW that is presently selected, until the initial learning time has elapsed. It is noted that the switching condition in this case may be the same as or different from the switching condition in Step S28.

Figure 15A:
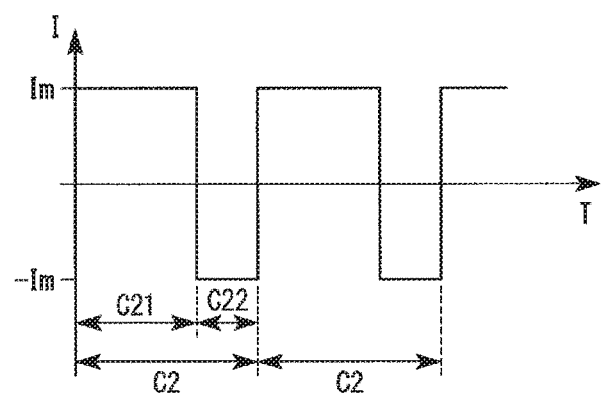
FIG. 15A is a diagram illustrating an example of the drive electric current waveform that is supplied to the discharge lamp in a shift drive according to the first embodiment.
Figure 15B:
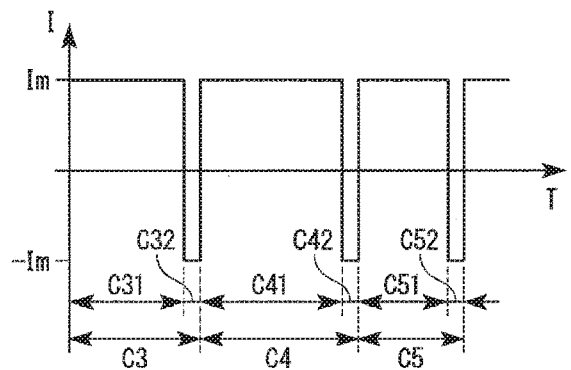
FIG. 15B is a diagram illustrating an example of the drive electric current waveform that is supplied to the discharge lamp in the shift drive according to the first embodiment.
Figure 16:
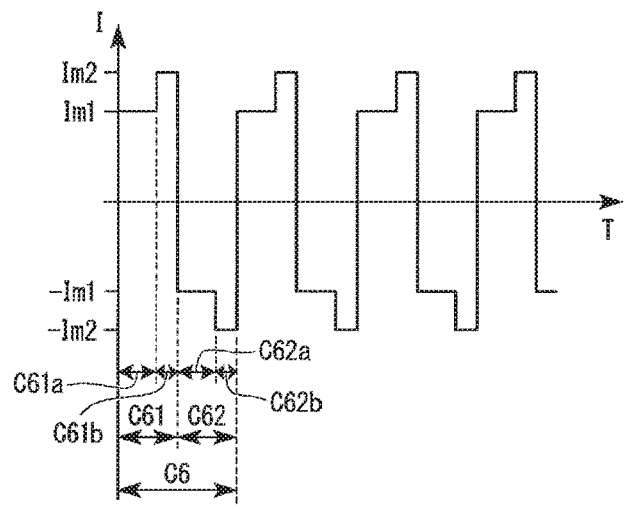
FIG. 16 is a diagram illustrating an example of the drive electric current waveform that is supplied to the discharge lamp in a leap drive according to the first embodiment.

Furthermore, the drive electric current waveform of the drive pattern DW is not particularly limited. For example, the drive electric current waveforms of the drive pattern DW may include drive electric current waveforms that are illustrated in FIGS. 15A, 15B, and 16. FIGS. 15A, 15B, and 16 are diagrams, each illustrating another example of the drive electric current waveform that is to be supplied to the discharge lamp 90 in the alternating current drive. In FIGS. 15A, 15B, and 16, the vertical axis represents the drive electric current I, and the horizontal axis represents time T. It is illustrated that the drive electric current I is set to be positive in the case of the first polarity state and is set to be negative in the case of the second polarity state.

Each of the alternating current drives that are illustrated in FIGS. 15A and 15B is a shift drive that has a duty ratio of smaller than 0.5 (50%). The drive electric current I that is supplied to the discharge lamp 90 in the shift drive that is illustrated in FIGS. 15A and 15B, for example, is rectangular-wave alternating electric current of which a polarity is inverted a plurality of times between the electric current value Im and the electric current value −Im.

In the shift drive in FIG. 15A, a length of periodicity C2 is constant. At the periodicity C2, a first polarity duration C21 that is the first polarity state, and a second polarity duration C22 that is the second polarity state are provided. A length of the first polarity duration C21 is longer than a length of the second polarity duration C22. That is, the shift drive that is illustrated in FIG. 15A has a periodicity, a length of the periodicity C2, a duty ratio, a length of the first polarity duration C21, and a length of the second polarity duration C22, as drive parameters.

In the shift drive that is illustrated in FIG. 15B, a length of a periodicity changes. In an example in FIG. 15B, a first periodicity C3, a second periodicity C4, and a third periodicity C5 are provided. A length of the first periodicity C3 is longer than a length of the third periodicity C5. A length of the second periodicity C4 is longer than a length of the first periodicity C3.

At the first periodicity C3, a first polarity duration C31 that is the first polarity state and a second polarity duration C32 that is the second polarity state are provided. A length of the second polarity duration C32 is shorter than a length of the first polarity duration C31. At the second periodicity C4, a first polarity duration C41 that is the first polarity state and a second polarity duration C42 that is the second polarity state are provided. A length of the second polarity duration C42 is shorter than a length of the first polarity duration C41. At the third periodicity C5, a first polarity duration C51 that is the first polarity state and a second polarity duration C52 that is the second polarity state are provided. A length of the second polarity duration C52 is shorter than a length of the first polarity duration C51.

The length of the first polarity duration C31 is longer than the length of the first polarity duration C51. The length of the first polarity duration C41 is longer than the length of the first polarity duration C31. The length of the second polarity duration C32, the length of the second polarity duration C42, and the length of the second polarity duration C52 are the same. The lengths of the first polarity durations C31, C41, and C51, for example, are equal to or longer than 5.0 ms (milliseconds) and are equal to or short than 20 ms (milliseconds). The lengths of the second polarity durations C32, C42, and C52 are shorter than 0.5 ms (milliseconds).

That is, in the same manner as the shift drive in FIG. 15A, the shift drive that is illustrated in FIG. 15B has a periodicity, a length of each periodicity, each duty ratio, a length of each first polarity duration, and a length of each second polarity duration, as drive parameters.

The alternating current drive that is illustrated in FIG. 16 is a leap drive in which an absolute value of the drive electric current I increases in each polarity state. In the leap drive that is illustrated in FIG. 16, the drive electric current I that is to be supplied to the discharge lamp 90, for example, is rectangular-wave alternating electric current of which an electric current value changes as Im1, Im2, −Im1, or −Im2. An absolute value of Im2 and −Im2 is greater than an absolute value of Im1 and −Im1. In the leap drive that is illustrated in FIG. 16, a length of a periodicity C6 is constant. A duty ratio of the alternating electric current that is illustrated in FIG. 16 is 0.5 (50%).

At the periodicity C6, a first polarity duration C61 that is the first polarity state and a second polarity duration C62 that is the second polarity state are provided. A length of the first polarity duration C61 and a length of the second polarity duration C62 are the same. The first polarity duration C61 includes the low electric current duration C61a and the high electric current duration C61b. The low electric current duration C61a is a duration during which the drive electric current I is at an electric current value Im1. The high electric current duration C61b is a duration during which the drive electric current I is at an electric current value Im2. A length of the high electric current duration C61b is shorter than a length of the low electric current duration C61a.

The second polarity duration C62 includes a low electric current duration C62a and a high electric current duration C62b. The low electric current duration C62a is a duration during which the drive electric current I is at an electric current value −Im1. The high electric current duration C62b is a duration during which the drive electric current I is at an electric current value −Im2. A length of the high electric current duration C62b is shorter than a length of the low electric current duration C62a. A length of the low electric current duration C61a is the same as the length of the low electric current duration C62a. A length of the high electric current duration C61b is the same as the length of the high electric current duration C62b.

That is, the leap drive that is illustrated in FIG. 16 has, as drive parameters, a periodicity, the length of the periodicity C6, the absolute value of the electric current value Im1 and −Im1, the absolute value of the electric current value Im2 and −Im2, the length of the first polarity duration C61, the length of the second polarity duration C62, the length of the low electric current duration C61a and the length of the high electric current duration C61b during the first polarity duration C61, the length of the low electric current duration C62a and the length of the high electric current duration C62b during the second polarity duration C62, a ratio for the low electric current duration C61a or the high electric current duration C61b during the first polarity duration C61, a ratio for the low electric current duration C62a or the high electric current duration C62b during the second polarity duration C62, a ratio of the absolute value of the electric current value Im2 and −Im2 and the absolute value of the electric current value Im1 and −Im1, and the like.

It is noted that in the above description, as an example of the alternating current drive, each of the drives that are illustrated in FIGS. 15A, 15B, and 16 is described, but no limitation to this is imposed. For example, each of the drives that are illustrated in FIGS. 15A, 15B, and 16 may be regarded as an example of the direct current drive. In this case, the polarity of the direct current drive and the length of the time for implementing the direct current drive are suitably changed, and thus the drive electric current waveform that is illustrated in each figure is created.

Furthermore, in the present embodiment, in a case where the lamp voltage Vla is at or above initial stage voltage value VlaS and is at or below the upper limit voltage value VlaU, as long as the first control in which the drive electric power Wd increases according to the increase in the lamp voltage Vla is performed, each control that changes the drive electric power Wd is not particularly limited. For example, the first control may be a control in which the drive electric current I, which is to be supplied to the discharge lamp 90, is not constant. In a case where the first control is performed, for example, the increase in the drive electric power Wd with respect to the increase in the lamp voltage Vla may be a linear change, and may be a circular or irregular change.

Furthermore, in the present embodiment, a control that is performed in a case where the lamp voltage Vla is below the initial stage voltage value VlaS, if it is a second control that maintains the drive electric power Wd in the first given electric power range without depending on the value of the lamp voltage Vla, may not be a constant electric power control. That is, in the second control, the drive electric power Wd, if in the first given electric power range, may change.

Furthermore, in the present embodiment, a control that is performed in a case where the lamp voltage Vla is above the upper limit voltage value VlaU, if it is a third control that maintains the drive electric power Wd in the second given electric power range without depending on the value of the lamp voltage Vla, may not be the constant electric power control. That is, in the third control, the drive electric power Wd, if in the second given electric power range, may change.

Furthermore, a control in a case where the lamp voltage Vla is below the initial stage voltage value VlaS and where the lamp voltage Vla is above the upper limit voltage value VlaU may not be the constant electric power control. That is, in the case where the lamp voltage Vla is below the initial stage voltage value VlaS and where the lamp voltage Vla is above the upper limit voltage value VlaU, the control unit 40 may change the drive electric power Wd.

Furthermore, the initial stage voltage value VlaS, for example, may be a value that is set in advance without depending on an individual difference of the discharge lamp 90. In this case, for example, when the discharge lamp 90 is lighted up for the first time, in some cases, the value of the lamp voltage Vla is below the initial stage voltage value VlaS. For this reason, when the discharge lamp 90 is lighted up for the first time, the control unit 40 performs the first constant electric power control CPC1.

Second Embodiment

Figure 17:
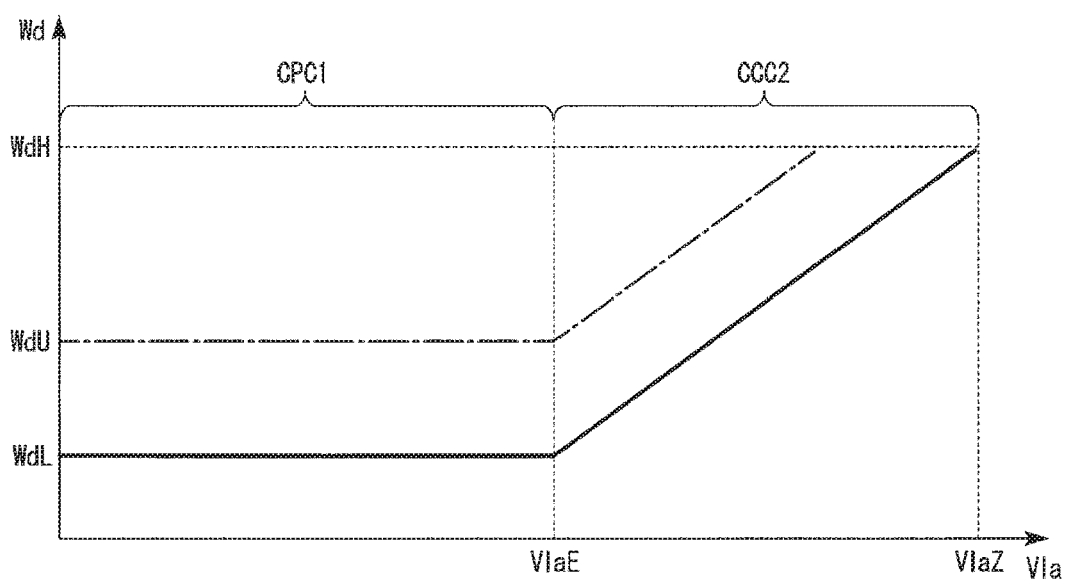
FIG. 17 is a graph representing a change in a drive electric power with respect to a lamp voltage in a second embodiment.

A second embodiment is different from the first embodiment in a timing for the switching between the constant electric power control and the constant electric current control. FIG. 17 is a graph representing the change in the drive electric power Wd with respect to the lamp voltage Vla in the present embodiment. In FIG. 17, the vertical axis represents the drive electric power Wd, and the horizontal axis represents the lamp voltage Vla.

In the present embodiment, the control unit 40 possibly performs the first constant electric power control CPC1 and a second constant electric current control (the first control) CCC2. As illustrated in FIG. 17, in the same manner as the first constant electric current control CCC1, the second constant electric current control CCC2 is a control in which the drive electric power Wd, which is to be supplied to the discharge lamp 90, increases according to the increase in the lamp voltage Vla. Furthermore, in the same manner as the first constant electric current control CCC1, the second constant electric current control CCC2 is a control in which the drive pattern DW is selected and implemented based on the machine learning. In the second constant electric current control CCC2, the drive electric current I, which is to be supplied to the discharge lamp 90 is constant. In the second constant electric current control CCC2, the drive electric power Wd changes linearly with respect to the lamp voltage Vla.

In a case where the lamp voltage Vla is at or above a last stage voltage value (the first voltage value) VlaE and is at or below a limit voltage value (the second voltage value) VlaZ that is higher than the last stage voltage value VlaE, the control unit 40 in the present embodiment performs the second constant electric current control CCC2. The last stage voltage value VlaE is the value of the lamp voltage Vla in the last stage for the discharge lamp 90, and may be a value that is higher than the value of the lamp voltage Vla (the initial stage voltage value VlaS) in the initial stage for the discharge lamp 90. The last stage voltage value VlaE, for example, is 90 V. The limit voltage value VlaZ is a maximum value of the lamp voltage Vla until the life of the discharge lamp 90 terminates. The limit voltage value VlaZ, for example, is the value of the lamp voltage Vla that is available when the life of the discharge lamp 90 terminates, that is, when the illumination level maintenance ratio Lr is at the limit value Lrmin.

In the second constant electric current control CCC2 according to the present embodiment, the value of the drive electric power Wd is at the low electric power value WdL in a case where the lamp voltage Vla is at the last stage voltage value VlaE, and is the rating electric power value WdH in a case where the lamp voltage Vla is at the limit voltage value VlaZ.

In a case where the lamp voltage Vla is below the last stage voltage value VlaE, the control unit 40 performs the first constant electric power control CPC1. That is, in the present embodiment, when the discharge lamp 90 is lighted up for the first time, first of all, the first constant electric power control CPC1 is performed.

As described above, in the present embodiment, the first constant electric power control CPC1 is performed from when the discharge lamp 90 is lighted up for the first time until the lamp voltage Vla reaches the last stage voltage value VlaE, and the second constant electric current control CCC2 is performed from when the lamp voltage Vla is at or above the last stage voltage value VlaE until the life of the discharge lamp 90 terminates.

Figure 18:
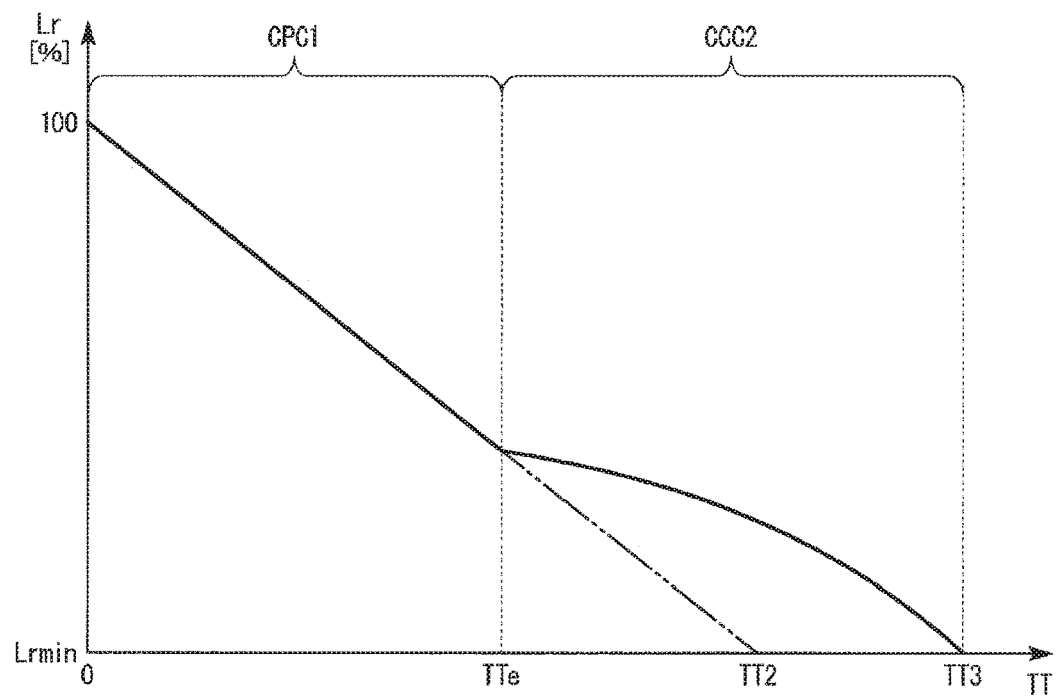
FIG. 18 is a graph representing a relationship between an accumulated lighting time and an illumination level maintenance ratio in the second embodiment.

FIG. 18 is a graph representing a relationship between the accumulated lighting time TT and an illumination level maintenance ratio Lr in the present embodiment. In FIG. 18, the vertical axis represents the illumination level maintenance ratio Lr [%], and the horizontal axis represents the accumulated lighting time TT. A solid line that is illustrated in FIG. 18 indicates a change in the illumination level maintenance ratio Lr in a case where the switching to each control that changes the drive electric power Wd in the present embodiment is performed. A two-dot chain line that is illustrated in FIG. 18 indicates the change in the illumination level maintenance ratio Lr in the case where the drive electric power Wd continues to be constantly maintained at the low electric power value WdL, without changing the drive electric power Wd. In an example in FIG. 18, when the accumulated lighting time TT is at a value TTe, the lamp voltage Vla is at the last stage voltage value VlaE.

According to the present embodiment, the last stage voltage value VlaE is a value that is higher than the lamp voltage Vla in the initial stage for the discharge lamp 90, and in a case where the lamp voltage Vla is at or above the last stage voltage value VlaE, the second constant electric current control CCC2 is performed. For this reason, the drive electric power Wd that is to be supplied to the discharge lamp 90 can be increased in the last stage for the discharge lamp 90. Accordingly, as illustrated in FIG. 18, after the accumulated lighting time TT is at the value TTe, that is, after the lamp voltage Vla is at the last stage voltage value VlaE, the degree to which the illumination level maintenance ratio Lr can be lowered compared with a case where the drive electric power Wd continues to be maintained at the low electric power value WdL. That is, this can make it difficult for the user of the discharge lamp 90 to recognize a reduction in the illumination level of the discharge lamp 90 in the last stage for the discharge lamp 90. Therefore, in the last stage for the discharge lamp 90, the illumination level of the discharge lamp 90 can be relatively maintained, and thus the comfortableness for the user can be improved. Furthermore, because the illumination level in the last stage for the discharge lamp 90 can be maintained to some degree, the time that the illumination level maintenance ratio Lr takes to reach the limit value Lrmin can be lengthened. That is, the life of the discharge lamp 90 can be prolonged. In an example in FIG. 18, in a control that continues to constantly maintain the drive electric power Wd at the low electric power value WdL, when the accumulated lighting time TT is at the value TT2, the illumination level maintenance ratio Lr reaches the limit value Lrmin. On the other hand, in a control that performs the switching among the controls which change the drive electric power Wd in the present embodiment, when the accumulated lighting time TT is at a value TT3 than is higher than the value TT2, the illumination level maintenance ratio Lr reaches the limit value Lrmin.

As described in the first embodiment and the second embodiment, in a case where the value of the lamp voltage Vla is in a certain range, as long as the control unit 40 performs the first control in which the drive electric power Wd increases according to the increase in the lamp voltage Vla, any control may be performed as a control that changes the drive electric power Wd. For example, in a control other than the first control, drive parameters of each drive pattern DW in the machine learning may include that of the drive electric power Wd. In this case, the drive pattern DW changes, and thus the drive electric power Wd changes without depending on the value of the lamp voltage Vla.

Third Embodiment

Figure 19:
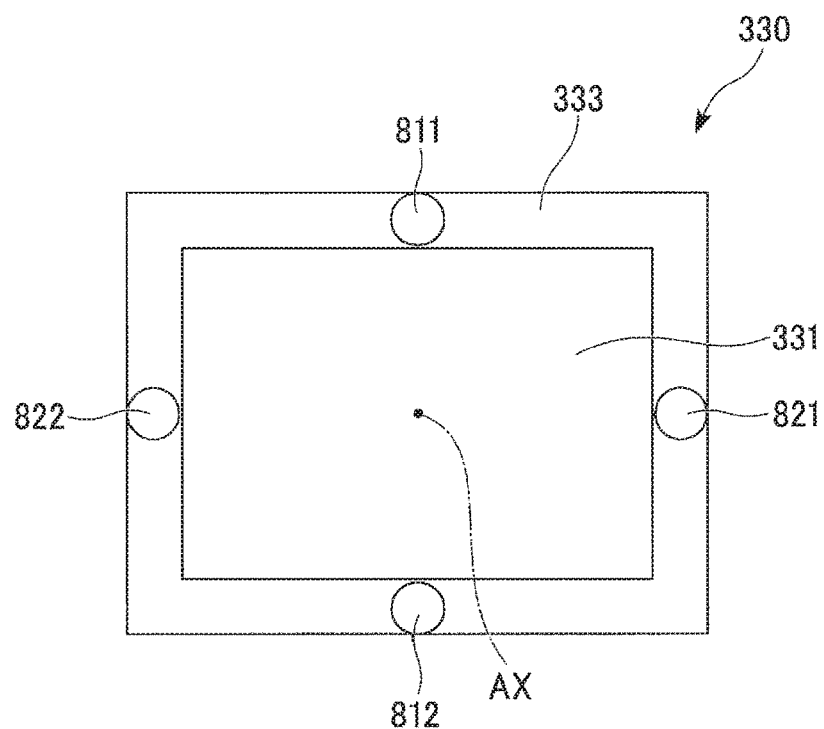
FIG. 19 is a diagram illustrating a liquid crystal light valve in a third embodiment, when viewed from the incident light side.

A third embodiment is different from the second embodiment in that the drive electric power Wd is changed based on movements of the protrusions 552p and 562p. FIG. 19 is a diagram illustrating a liquid crystal light valve 330 in the present embodiment, when viewed from the incident light side. The liquid crystal light valve 330 includes an incidence side polarization plate 331 (the light polarization element) and a holding frame 333. The incidence side polarization plate 331 is the same as the incidence-side polarization plates 331R, 331G, and 331B according to the first embodiment. The holding frame 333 surrounds the incidence side polarization plate 331 for holding. The holding frame 333 is in the shape of a rectangle.

The projector in the present embodiment includes a pair of first temperature sensors 811 and 812 and a pair of second temperature sensors 821 and 822. It is possible that the first temperature sensors 811 and 812 and the second temperature sensors 821 and 822 measure a temperature. The first temperature sensor (a first detection unit) 811 and the first temperature sensor (a second detection unit) 812 are positioned in such a manner that the optical axis AX of a light which is emitted from the discharge lamp 90 and is incident on the incidence side polarization plate 331 is interposed between them in one direction (the upward-downward direction in FIG. 19) that perpendicularly intersects the optical axis AX. The second temperature sensor (the first detection unit) 821 and the second temperature sensor (the second detection unit) 822 are positioned in such a manner that the optical axis AX of the light which is emitted from the discharge lamp 90 and is incident on the incidence side polarization plate 331 is interposed between them in one direction (the leftward-rightward direction in FIG. 19) that perpendicularly intersects the optical axis AX. A direction in which the optical axis AX is interposed between the pair of the first temperature sensors 811 and 812, and a direction in which the optical axis AX is interposed between the pair of the second temperature sensors 821 and 822 perpendicularly intersect each other.

The first temperature sensors 811 and 812 and the second temperature sensors 821 and 822 are positioned on the holding frame 333. For more detail, the first temperature sensors 811 and 812 and the second temperature sensors 821 and 822 are fixed to the holding frame 333 in the direction that is the same as the direction in which the light is incident on the incidence side polarization plate 331.

The liquid crystal light valve 330 to which each temperature sensor is fixed is illuminated with a portion of the light with which the holding frame 333 is illuminated. With each temperature sensor, the temperature is measured, and thus a shift in the optical axis AX can be detected and movements of the protrusions 552p and 562p in the discharge lamp 90 can be detected. The detail will be described.

Figure 20:
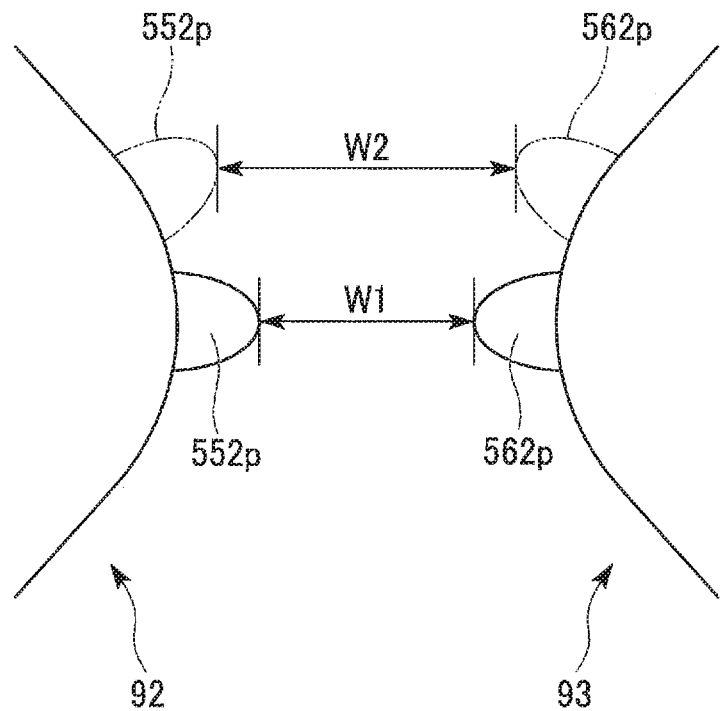
FIG. 20 is a diagram illustrating an example of a movement of the protrusion on the electrode head portion in the discharge lamp.

FIG. 20 is a diagram illustrating examples of the movements of the protrusions 552p and 562p. The upward-downward direction in FIG. 20 is a direction that is the same as the upward-downward direction in FIG. 19, and it is assumed that the same is also true for an upward-downward relationship. For example, in a case where the protrusions 552p and 562p are present in positions that are indicated by solid lines in FIG. 20, it is assumed that the optical axis AX of the light passes through the center of the incidence side polarization plate 331. It is assumed that positions (positions that are indicated by the solid lines in FIG. 20) of the protrusions 552p and 562p at this time are normal positions.

At this point, a case where the protrusions 552p and 562p move to positions, respectively, that are indicated by two-dot chain lines in FIG. 20 is considered. In this case, a position of arc discharge that occurs between the protrusions 552p and 562p is shifted upward in FIG. 20 and is shifted more upward than the optical axis AX of the light that is emitted from the discharge lamp 90. In this case, a temperature measured by the first temperature sensor 811 that is positioned above the optical axis AX increases and a temperature measured by the first temperature sensor 812 that is positioned below the optical axis AX decreases, compared with a case where the protrusions 552p and 562p are present in the positions, respectively, that are indicated by the solid lines in FIG. 20. For this reason, it is detected that a difference between the temperature measured by the first temperature sensor 811 and the temperature measured by the first temperature sensor 812 increases and thus it can be detected that the protrusions 552p and 562p move to the portions, respectively, that are indicated by the two-dot chain lines in FIG. 20.

On the other hand, in a case where the protrusions 552p and 562p are shifted downward, the temperature measured by the first temperature sensor 811 that is positioned above the optical axis AX decreases, and the temperature measured by the first temperature sensor 812 that is positioned below the optical axis AX increases. For this reason, it is detected that a difference between the temperature measured by the first temperature sensor 811 and the temperature measured by the first temperature sensor 812 decreases and thus it can be detected that the protrusions 552p and 562p move downward. In this manner, based on a result of the measurement by the first temperature sensor 811 and a result of the measurement by the first temperature sensor 812, the control unit 40 in the present embodiment detects the movements of the protrusions 552p and 562p.

It is noted that, in some cases, depending on the optical system from the discharge lamp 90 to the incidence side polarization plate 331, the upward-downward relationship between the liquid crystal light valve 330 in FIG. 19 and the protrusions 552p and 562p in the discharge lamp 90 in FIG. 20 is turned upside down. That is, for example, in a case where the protrusions 552p and 562p move to the positions, respectively, that are indicated by the two-dot chain lines in FIG. 20 and thus the position of the arc discharge is shifted upward, the upward-downward relationship is turned upside down while the light that is emitted from the discharge lamp 90 is guided to the incidence side polarization plate 331, and the optical axis AX of the light that is incident on the incidence side polarization plate 331 is shifted downward. For this reason, the temperature measured by the first temperature sensor 811 that is positioned above the optical axis AX in FIG. 19 decreases and the temperature measured by the first temperature sensor 812 that is positioned below the optical axis AX increases.

Furthermore, even in a case where the protrusions 552p and 562p move and the position of the arc discharge is shifted in the leftward-rightward direction in FIGS. 19 and 20, in the same manner as in the example described above, the control unit 40 detects the movements of the protrusions 552p and 562p based on a result of measurement by the second temperature sensor 821 and a result of measurement by the second temperature sensor 822.

It is noted that, in a case where the optical axis AX passes through the center of the incidence side polarization plate 331, a temperature that is measured by the second temperature sensor 821 and for example, a temperature that is measured by the second temperature sensor 822 are the same. For this reason, in a case where it is detected that the temperature that is measured by the second temperature sensor 821 and the temperature that is measured by the second temperature sensor 822 are different temperatures, the control unit 40 can detect the movements of the protrusions 552p and 562p.

On the other hand, in a case where the optical axis AX passes through the center of the incidence side polarization plate 331, the temperature that is measured by the first temperature sensor 811 is higher than, for example, the temperature that is measured by the first temperature sensor 812. This is because ambient air that is heated rises up by convection, and the ambient temperature of the first temperature sensor 811 rises up. For this reason, in a case where the movements of the protrusions 552p and 562p are detected from the difference between the temperature that is measured by the first temperature sensor 811 and the temperature that is measured by the first temperature sensor 812, there is a need to consider a difference between temperatures that are measured by the first temperature sensors 811 and 812 in a case where the optical axis AX passes through the center of the incidence side polarization plate 331.

In a case where, as described above, the movements of the protrusions 552p and 562p are detected by the temperature sensors, respectively, the control unit 40 increases the drive electric power Wd. Specifically, in a case where the movements of the protrusions 552p and 562p are detected, the control unit 40, for example, changes the drive electric power Wd as indicated by a dashed line in FIG. 17. In an example in FIG. 17, in a case where, in the first constant electric power control CPC1, the movements of the protrusions 552p and 562p are detected, the control unit 40 increases the drive electric power Wd to a high electric power value WdU that is higher than the low electric power value WdL. In a case where the protrusions 552p and 562p return to their respective original positions (the positions that are indicated by the solid lines in FIG. 20), that is, in a case where, based on the result of the measurement by each temperature sensor, the control unit 40 detects that there are no movements of the protrusions 552p and 562p, the control unit 40 decreases the drive electric power Wd, and causes the drive electric power Wd to return to its original value (the low electric power value WdL).

For example, when the movements of the protrusions 552p and 562p take place, regardless of a small amount of wear of the protrusions 552p and 562p, an inter-electrode distance between the first electrode 92 and the second electrode 93 increases, and the lamp voltage Vla increases. For example, in FIG. 20, an inter-electrode distance W2 between the protrusions 552p and 562p, which is indicated by a two-dot chain line, is longer than an inter-electrode distance W1 between the protrusions 552p and 562p, which is indicated by a solid line. In this manner, as factors in causing the lamp voltage Vla to increase, not only the wear of the protrusions 552p and 562p, but also the movements of the protrusions 552p and 562p are given. Therefore, in a case where the movements of the protrusions 552p and 562p take place, when the evaluation of the drive pattern DW is made in the machine learning based on only the change in the lamp voltage Vla, in some cases, the drive pattern DW cannot be suitably evaluated.

In contrast, according to the present embodiment, in a case where the movements of the protrusions 552p and 562p are detected, the control unit 40 increases the drive electric power Wd. Accordingly, the thermal load that is applied to the first electrode 92 and the second electrode 93 can be increased, and a range of melting of, and an amount of melting, of the protrusions 552p and 562p can be increased. Therefore, when the melted protrusions 552p and 562p are reformed, it is easy for the protrusions 552p and 562p to return to their respective normal positions (for example, the positions that are indicated by the solid lines in FIG. 20). As described above, according to the present embodiment, in a case where the movements of the protrusions 552p and 562p take place, the protrusions 552p and 562p easily return to their respective original positions. Because of this, the lamp voltage Vla that undergoes a change due to the movements of the protrusions 552p and 562p easily returns to its original state. Therefore, even in a case where, in the machine learning, the evaluation of the drive pattern DW is made based on only the change in the lamp voltage Vla, the drive pattern DW is easy to evaluate suitably. As a result, the life of the discharge lamp 90 can be more prolonged.

Furthermore, according to the present embodiment, based on the result of the measurement by the first temperature sensor 811 and the result of the measurement by the first temperature sensor 812, or based on the result of the measurement by the second temperature sensor 821 and the result of the measurement by the second temperature sensor 822, the control unit 40 detects the movements of the protrusions 552p and 562p, and increases the drive electric power Wd. Specifically, the control unit 40 increases the drive electric power Wd in a case where the difference between the temperature that is measured by the first temperature sensor 811 and the temperature that is measured by the first temperature sensor 812 changes, or in a case where the difference between the temperature that is measured by the second temperature sensor 821 and the temperature that is measured by the second temperature sensor 822 changes. For this reason, the movements of the protrusions 552p and 562p are easy to detect.

Furthermore, according to the present embodiment, each temperature sensor is positioned on the holding frame 333 that holds the incidence side polarization plate 331. For this reason, the irradiation with one portion of the light that is emitted from the discharge lamp 90 is easy, and the shift in the optical axis AX of the light that is emitted from the discharge lamp 90 is easily detected. Accordingly, the movements of the protrusions 552p and 562p are more easily detected.

It is noted that in the present embodiment, the following configurations and methods can be employed.

As the first detection unit and the second detection unit, one pair of illumination level sensors may be provided instead of one pair of the first temperature sensors 811 and 812. It is possible that the pair of the illumination level sensors measure the illumination level. In this case, with a change in the illumination level that is measured by each of the pair of the illumination level sensors, the control unit 40 detects a shift in the arc discharge, and detects the movements of the protrusions 552p and 562p. That is, in a case where a difference between the illumination level that is measured by one illumination level sensor and the illumination level that is measured by the other illumination level sensor changes, the control unit 40 detects the movements of the protrusions 552p and 562p and increases the drive electric power Wd. Accordingly, in the same manner as in the case of each temperature sensor described above, the life of the discharge lamp 90 can be more prolonged.

Furthermore, as the first detection unit and the second detection unit, one pair of the illumination level sensors may be provided instead of the second temperature sensors 821 and 822. Furthermore, as the first detection unit and the second detection unit, sensors each of which possibly measures a temperature and an illumination level may be provided. Furthermore, one pair of temperature sensors and one pair of illumination level sensors each may be provided.

Furthermore, as long as the drive electric power Wd is increased based on a result of the measurement by the first detection unit and a result of measurement by the second detection unit, actually, the control unit 40 may not detect the movements of the protrusions 552p and 562p. That is, for example, even in a case where the movements of the protrusions 552p and 562p do not take place actually, the control unit 40 may increase the drive electric power Wd based on the result of the measurement by the first detection unit and the result of the measurement by the second detection unit.

Furthermore, in addition to the change in the lamp voltage Vla, the control unit 40 may add the movements of the protrusions 552p and 562p to evaluation items for the machine learning. Specifically, the result of the evaluation of the drive pattern DW in which the protrusions 552p and 562p that are moved return to their respective original positions may be set to be at a high level. With this configuration, the drive pattern DW in which it is difficult for the movements of the protrusions 552p and 562p to take place (in which the protrusions 552p and 562p, although moved, easily return to their respective original positions) is easily implemented, and the movements of the protrusions 552p and 562p can be suppressed. Therefore, the life of the discharge lamp 90 can be more prolonged. Furthermore, in this case, in a case where the result of the evaluation of the lamp voltage Vla and the result of the evaluation of the movements of the protrusions 552p and 562p conflict with each other, the result of the evaluation of the lamp voltage Vla may take precedence over the other.

Furthermore, in the embodiments described above, the example of the case in which the invention is applied in a transmission type projector is described, but the invention can also be applied in a reflection type projector. At this point, the term "transmission type" refers to a type meaning that a liquid crystal light valve including a liquid crystal panel and the like transmits light. The term "reflection type" refers to a type meaning that a liquid crystal light valve reflects light. It is noted that the light modulation device is not limited to a liquid crystal panel and the like, and for example, may be a light modulation device that uses a micro-mirror.

Furthermore, in the embodiments described above, the example of the projector 500 that uses three liquid crystal panels, including the liquid crystal panels 560R, 560G, and 560B (the liquid crystal light valves 330R, 330G, and 330B) is given, but the invention can also be applied in a projector that uses one liquid crystal panel and a projector that uses four or more liquid crystal panels.

Furthermore, the configurations described above can be suitably combined within a range in which the configurations do not conflict with each other.

The entire disclosure of Japanese Patent Application No. 2017-247350, filed Dec. 25, 2017 is expressly incorporated by reference herein.

What is claimed is:

1. A discharge lamp drive device comprising:
    a discharge lamp driver configured to supply drive electric current to a discharge lamp having a first electrode and a second electrode;
    a control unit configured to control the discharge lamp driver; and
    a storage unit configured to store a plurality of drive patterns of the drive electric current,
    wherein the control unit is configured to select one drive pattern from among the plurality of drive patterns based on machine learning, and implement the selected drive pattern, and
    wherein the control unit performs a first control that increases a drive electric power supplied to the discharge lamp according to an increase in an inter-electrode voltage of the discharge lamp, in a case where the inter-electrode voltage is equal to or larger than a first voltage value and the inter-electrode voltage is equal to or lower than a second voltage value that is higher than the first voltage value.

2. The discharge lamp drive device according to claim 1, wherein in the first control, the control unit supplies the drive electric current whose electric current value is constant, to the discharge lamp.

3. The discharge lamp drive device according to claim 1, wherein the control unit performs a second control that maintains the drive electric power in a first given electric power range without depending on a value of the inter-electrode voltage, in a case where the inter-electrode voltage is lower than the first voltage value.

4. The discharge lamp drive device according to claim 3, wherein the control unit sets the drive electric power supplied to the discharge lamp in the first control to be at a given electric power value, in a case where the inter-electrode voltage is at the first voltage value in the first control, and
    wherein the control unit maintains the drive electric power supplied to the discharge lamp at the given electric power value in the second control.

5. The discharge lamp drive device according to claim 1, wherein the first voltage value is a value of an inter-electrode voltage in an initial stage for the discharge lamp.

6. The discharge lamp drive device according to claim 1, wherein the first voltage value is a value that is higher than a value of an inter-electrode voltage in an initial stage for the discharge lamp.

7. The discharge lamp drive device according to claim 1, wherein the control unit performs a third control that maintains the drive electric power in a second given electric power range without depending on a value of the inter-electrode voltage, in a case where the inter-electrode voltage is larger than the second voltage value.

8. The discharge lamp drive device according to claim 7, wherein the control unit increases the drive electric power supplied to the discharge lamp in the first control up to a rating electric power value for the discharge lamp, in a case where the inter-electrode voltage is at the second voltage value in the first control, and wherein the control unit maintains the drive electric power supplied to the discharge lamp at the rating electric power value in the third control.

9. The discharge lamp drive device according to claim 1, wherein protrusions are formed on a head of the first electrode and a head of the second electrode, respectively, and
wherein the control unit increases the drive electric power in a case where a movement of the protrusion is detected.

10. The discharge lamp drive device according to claim 9, further comprising:
a first detection unit and a second detection unit that are positioned in such a manner that an optical axis of a light emitted from the discharge lamp is interposed between the first detection unit and the second detection unit,
wherein the first detection unit and the second detection unit are configured to measure at least one of a temperature and an illumination level, and
wherein the control unit detects the movement of the protrusion and increases the drive electric power, based on a result of the measurement by the first detection unit and a result of the measurement by the second detection unit.

11. The discharge lamp drive device according to claim 10,
wherein the first detection unit and the second detection unit measure the temperature, and
wherein the control unit detects the movement of the protrusion and increases the drive electric power, in a case where a difference between the temperature measured by the first detection unit and the temperature measured by the second detection unit changes.

12. The discharge lamp drive device according to claim 10,
wherein the first detection unit and the second detection unit measure the illumination level, and
wherein the control unit detects the movement of the protrusion and increases the drive electric power, in a case where a difference between the illumination level measured by the first detection unit and the illumination level measured by the second detection unit changes.

13. A projector comprising:
a discharge lamp configured to emit light;
the discharge lamp drive device according to claim 1;
a light modulation device configured to modulate the light emitted from the discharge lamp according to an image signal; and
a projection optical system configured to project the light modulated by the light modulation device.

14. The projector according to claim 13, further comprising:
a light polarization element that is positioned on a light incident side on the light modulation device;
a holding frame holding the light polarization element; and
a first detection unit and a second detection unit that are positioned in such a manner that an optical axis of a light which is emitted from the discharge lamp and is incident on the light polarization element is interposed between the first detection unit and the second detection unit,
wherein the first detection unit and the second detection unit measure at least one of a temperature and an illumination level, and are positioned on the holding frame on the same side as in a light incident side of the light polarization element, and
wherein the control unit increases the drive electric power based on a result of the measurement by the first detection unit and a result of the measurement by the second detection unit.

15. A projector comprising:
a discharge lamp configured to emit light;
the discharge lamp drive device according to claim 2;
a light modulation device configured to modulate the light emitted from the discharge lamp according to an image signal; and
a projection optical system configured to project the light modulated by the light modulation device.

16. A projector comprising:
a discharge lamp configured to emit light;
the discharge lamp drive device according to claim 3;
a light modulation device configured to modulate the light emitted from the discharge lamp according to an image signal; and
a projection optical system configured to project the light modulated by the light modulation device.

17. A projector comprising:
a discharge lamp configured to emit light;
the discharge lamp drive device according to claim 4;
a light modulation device configured to modulate the light emitted from the discharge lamp according to an image signal; and
a projection optical system configured to project the light modulated by the light modulation device.

18. A projector comprising:
a discharge lamp configured to emit light;
the discharge lamp drive device according to claim 5;
a light modulation device configured to modulate the light emitted from the discharge lamp according to an image signal; and
a projection optical system configured to project the light modulated by the light modulation device.

19. A projector comprising:
a discharge lamp configured to emit light;
the discharge lamp drive device according to claim 6;
a light modulation device configured to modulate the light emitted from the discharge lamp according to an image signal; and
a projection optical system configured to project the light modulated by the light modulation device.

20. An discharge lamp drive method configured to supply drive electric current to a discharge lamp having a first electrode and a second electrode to drive the discharge lamp, the method comprising:
selecting one drive pattern from among a plurality of drive patterns of the drive electric current based on machine learning;
implementing the selected drive pattern; and
performing a first control that increases a drive electric power supplied to the discharge lamp according to an increase in an inter-electrode voltage of the discharge lamp, in a case where the inter-electrode voltage is equal to or larger than a first voltage value and the inter-electrode voltage is equal to or lower than a second voltage value that is higher than the first voltage value.

* * * * *